(12) United States Patent
Maeng

(10) Patent No.: US 11,308,954 B2
(45) Date of Patent: Apr. 19, 2022

(54) METHOD FOR ASSOCIATING AN AI DEVICE WITH A DEVICE BASED ON A BEHAVIOR PATTERN OF A USER AND AN APPARATUS THEREFOR

(71) Applicant: LG ELECTRONICS INC., Seoul (KR)

(72) Inventor: Jichan Maeng, Seoul (KR)

(73) Assignee: LG ELECTRONICS INC., Seoul (KR)

(*) Notice: Subject to any disclaimer, the term of this patent is extended or adjusted under 35 U.S.C. 154(b) by 217 days.

(21) Appl. No.: 16/556,061

(22) Filed: Aug. 29, 2019

(65) Prior Publication Data
US 2019/0392833 A1    Dec. 26, 2019

(30) Foreign Application Priority Data
Aug. 7, 2019   (KR) .......................... 10-2019-0096272

(51) Int. Cl.
| | |
|---|---|
| *G10L 15/22* | (2006.01) |
| *G06K 9/00* | (2022.01) |
| *G10L 15/30* | (2013.01) |
| *G05D 1/00* | (2006.01) |
| *G05B 13/02* | (2006.01) |
| *H04L 67/12* | (2022.01) |

(52) U.S. Cl.
CPC ............ *G10L 15/22* (2013.01); *G05B 13/027* (2013.01); *G05D 1/0088* (2013.01); *G06K 9/00335* (2013.01); *G10L 15/30* (2013.01); *G05D 2201/0213* (2013.01); *G10L 2015/223* (2013.01); *H04L 67/12* (2013.01)

(58) Field of Classification Search
CPC ....... G10L 15/22; G10L 15/00; G10L 15/063; G10L 15/08; G10L 15/083; G10L 15/16; G10L 15/20; G10L 15/24; G10L 15/25; G10L 15/26; G10L 2015/0638; G10L 2015/1822; G10L 2015/221–228
USPC ..... 704/275, 270.1, 270, 231, 235, 251, 257
See application file for complete search history.

(56) References Cited

U.S. PATENT DOCUMENTS

| | | | |
|---|---|---|---|
| 2015/0120618 A1* | 4/2015 | Hong | G06Q 30/02 706/11 |
| 2019/0339840 A1* | 11/2019 | Park | G02B 27/017 |
| 2019/0341042 A1* | 11/2019 | Kim | G06F 3/167 |

* cited by examiner

*Primary Examiner* — Qi Han
(74) *Attorney, Agent, or Firm* — Lee, Hong, Degerman, Kang & Waimey PC

(57) ABSTRACT

Provided are a method of associating an AI device with a device based on a behavior pattern of a user and a device therefor. The method of associating the AI device with the device according to an embodiment of the invention receives a preset behavior pattern of the user sensed by a first camera from the first camera, receives a voice command for controlling an operation of the device from the user, and transmits the voice command to the device, thus allowing devices having no AI function to be used in conjunction with the AI device. The AI device and the dive of the invention may be associated with artificial intelligence modules, drones (unmanned aerial vehicles (UAVs)), robots, augmented reality (AR) devices, virtual reality (VR) devices, devices related to 5G service, etc.

11 Claims, 11 Drawing Sheets

METHOD FOR ASSOCIATING AN AI DEVICE WITH A DEVICE BASED ON A BEHAVIOR PATTERN OF A USER AND AN APPARATUS THEREFOR

CROSS-REFERENCE TO RELATED APPLICATIONS

Pursuant to 35 U.S.C. § 119(a), this application claims the benefit of earlier filing date and right of priority to Korean Patent Application No. 10-2019-0096272, filed on Aug. 7, 2019, the contents of which are hereby incorporated by reference herein in its entirety.

BACKGROUND OF THE INVENTION

Field of the invention

The present invention relates to a method of associating an AI device with a device based on a behavior pattern of a user and a device therefor and, more particularly, to a method and device, intended to recognize a user's life and behavior pattern to thereby execute an operation of a device associated with an AI device through a voice command.

Related Art

Recently, due to the development of information and communication technology, IoT technology is also improved greatly.

However, the IoT technology is developed, but there are many devices that do not have an AI function yet.

Therefore, there is a need for a method of associating several devices having no AI function with AI devices using the IoT technology, and research on the method is being conducted.

SUMMARY OF THE INVENTION

The present invention is to solve the necessities and/or problems described above.

The present invention provides a method and device for associating a device having no AI function with AI devices.

The present invention also provides a method and device intended to recognize a user's behavior pattern to thereby execute an operation of a device based on his or her behavior pattern.

In an aspect, in a method of associating an Artificial Intelligence (AI) device with a device based on a behavior pattern of a user, the method performed by the AI device includes receiving a preset behavior pattern of the user sensed by a first camera from the first camera; receiving a voice command for controlling an operation of the device, from the user; and transmitting the voice command to the device, wherein the voice command is a command corresponding to the preset behavior pattern of the user.

The transmitting of the voice command to the device may include transmitting the voice command to a server; receiving a control instruction for controlling an operation of the device corresponding to the voice command from the server; and transmitting the control instruction to the device.

The method may further include receiving an operation performance result corresponding to the control instruction, from the device.

The receiving of the voice command for controlling the operation of the device from the user may include operating in a standby status to receive the voice command; and receiving the voice command to perform the operation of the device from the user in the standby status, wherein the standby status may be performed for a preset time, and the preset time may be determined on the basis of the preset behavior pattern of the user.

The method may further include receiving information about the user's spatial movement from a second camera, when the first camera and the device is located at a first space, the second camera and the AI device is located at a second space, and the user moves from the first space to the second space, wherein the information about the user's spatial movement may be information that is obtained by sensing the user's spatial movement using the first camera and is transmitted to the second camera.

The first camera, the AI device and the device may be connected to each other via an Internet of Things (IOT) network.

In another aspect, an AI device for performing a method of associating the Artificial Intelligence (AI) device with a device based on a behavior pattern of a user may include a Radio Frequency (RF) module configured to transmit and receive a wireless signal; and a processor functionally connected to the RF module, wherein the processor receives a preset behavior pattern of the user sensed by a first camera from the first camera, receives a voice command for controlling an operation of the device from the user, and transmits the voice command to the device, wherein the voice command is a command corresponding to the preset behavior pattern of the user.

The processor may transmit the voice command to a server, may receive a control instruction for controlling an operation of the device corresponding to the voice command from the server, and may transmit the control instruction to the device.

The processor may receive an operation performance result corresponding to the control instruction, from the device.

The processor may operate in a standby status to receive the voice command, and may receive the voice command to perform the operation of the device from the user in the standby status, wherein the standby status may be performed for a preset time, and the preset time may be determined on the basis of the behavior pattern of the user.

The processor may receive information about the user's spatial movement from a second camera, when the first camera and the device is located at a first space, the second camera and the AI device is located at a second space, and the user moves from the first space to the second space, wherein the information about the user's spatial movement may be information that is obtained by sensing the user's spatial movement using the first camera and is transmitted to the second camera.

The first camera, the AI device and the device may be connected to each other via an Internet of Things (IOT) network.

In a further aspect, an electronic device includes at least one processor; a memory; and at least one program, wherein the program is stored in the memory and is executed by the processor, the program including a command for performing the method of claim 1.

In yet another aspect, a method of associating an AI device with a device based on a behavior pattern includes performing an initial access procedure to an Artificial Intelligence (AI) device by periodically transmitting a Synchronization Signal Block (SSB); performing a random access procedure to the AI device; transmitting an uplink (UL) grant to the AI device to control an operation of the device;

transmitting a control instruction corresponding to a voice command for controlling the operation of the device to the AI device, on the basis of the uplink grant, the voice command corresponding to a preset behavior pattern of a user; and transmitting the control instruction to the device.

The method may further include performing a downlink (DL) beam management procedure using the SSB.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the technical features of the invention. In the drawings.

DESCRIPTION OF EXEMPLARY EMBODIMENTS

Figure 1:
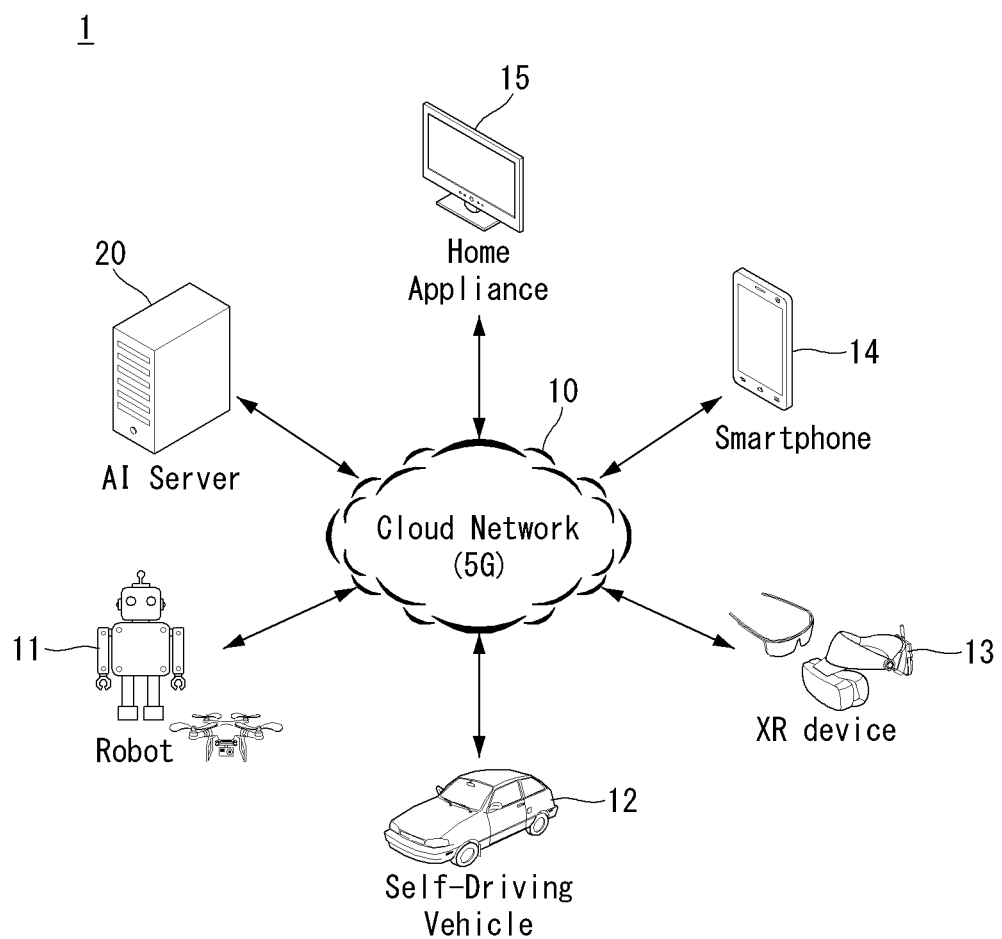
FIG. 1 is a conceptual diagram illustrating an embodiment of an AI device.

Hereinafter, embodiments of the disclosure will be described in detail with reference to the attached drawings. The same or similar components are given the same reference numbers and redundant description thereof is omitted. The suffixes "module" and "unit" of elements herein are used for convenience of description and thus can be used interchangeably and do not have any distinguishable meanings or functions. Further, in the following description, if a detailed description of known techniques associated with the present invention would unnecessarily obscure the gist of the present invention, detailed description thereof will be omitted. In addition, the attached drawings are provided for easy understanding of embodiments of the disclosure and do not limit technical spirits of the disclosure, and the embodiments should be construed as including all modifications, equivalents, and alternatives falling within the spirit and scope of the embodiments.

While terms, such as "first", "second", etc., may be used to describe various components, such components must not be limited by the above terms. The above terms are used only to distinguish one component from another.

When an element is "coupled" or "connected" to another element, it should be understood that a third element may be present between the two elements although the element may be directly coupled or connected to the other element. When an element is "directly coupled" or "directly connected" to another element, it should be understood that no element is present between the two elements.

The singular forms are intended to include the plural forms as well, unless the context clearly indicates otherwise.

In addition, in the specification, it will be further understood that the terms "comprise" and "include" specify the presence of stated features, integers, steps, operations, elements, components, and/or combinations thereof, but do not preclude the presence or addition of one or more other features, integers, steps, operations, elements, components, and/or combinations.

Hereinafter, 5G communication (5th generation mobile communication) required by an apparatus requiring AI processed information and/or an AI processor will be described through paragraphs A through G.

Three major requirement areas of 5G include (1) an enhanced mobile broadband (eMBB) area, (2) a massive machine type communication (mMTC) area, and (3) an ultra-reliable and low latency communications (URLLC) area.

Some use cases may require multiple areas for optimization, while other use cases may be focused on only one key performance indicator (KPI). 5G supports these various use cases in a flexible and reliable manner.

The eMBB is much better than a basic mobile internet access, and covers media and entertainment applications in abundant two-way operations, cloud or augmented reality. Data is one of key engines of 5G, and a dedicated voice service cannot be found in the 5G era for the first time. In 5G, voice is expected to be processed as an application program simply using data connection provided by a communication system. Main reasons for an increased traffic volume include an increase in contents size and an increase in the number of applications requiring high data transfer rates. Streaming services (audio and video), interactive video, and mobile internet connections will be more widely used as more devices are connected to the internet. Many application programs require connectivity to enable them to be always turned on to thereby push real-time information and notification to a user. A cloud storage and an application are rapidly increasing in a mobile communication platform, and are applicable to both work and entertainment. Furthermore, the cloud storage is a special use case to drive the growth of an uplink data transfer rate. 5G is also used for remote work of the cloud, and requires much lower end-to-end latency to maintain a good user experience when a haptic interface is used. Entertainment, for example, cloud gaming and video streaming are another key factor in increasing the demand for mobile broadband capabilities. The entertainment is essential in a smartphone and a tablet in any place including high mobility environment, such as trains, cars and airplanes. Another use case is augmented reality and information retrieval for the entertainment. Here, the augmented reality requires very low latency and an instantaneous data volume.

Furthermore, one of the most expected 5G use cases relates to the function of smoothly connecting an embedded sensor in all fields, that is, the mMTC. By 2020, potential IoT devices are expected to reach 20.4 billion. Industrial IoT is one of areas where 5G plays a major role in enabling smart cities, asset tracking, smart utilities, and agriculture and security infrastructures.

The URLLC includes new services that will change the industry through the remote control of major infrastructures and a link having ultra-reliable/low available latency, such as self-driving vehicles. The level of reliability and latency is essential for smart grid control, industrial automation, robotics, drone control and adjustment.

Next, multiple use cases will be described in more detail.

5G is a means that provides streams ranging from hundreds of megabits per second to gigabits per second, and may complement FTTH (fiber-to-the-home) and cable-based broadband (or DOCSIS). This high speed is required to deliver TVs with resolution of 4K or more (6K, 8K or more) as well as virtual reality and augmented reality. The VR (virtual reality) and the AR (augmented reality) applications almost include immersive sporting events. A certain application program may require special network settings. For example, in the case of VR games, game companies should integrate a core server with an edge network server of a network operator so as to minimize latency.

An automobile is expected to be a new driving force that is important for 5G together with many use cases of mobile communication for vehicles. For example, entertainment for passengers requires a mobile broadband simultaneously having a high capacity and high mobility. The reason is because future users continue to expect high-quality connections regardless of their positions and speed. Another use case of an automotive field is an augmented reality dashboard. This identifies an object in the dark above things which a driver sees through a windshield, overlaps and displays pieces of information informing a driver of the distance and the movement of the object. In the future, a wireless module enables communication between vehicles, the exchange of information between a vehicle and a support infrastructure, and the exchange of information between an automobile and other connected devices (e.g. devices carried by pedestrians). A safety system guides alternative courses of a behavior to allow a driver to drive more safely, thus reducing the risk of an accident. A next step will be a remotely controlled or self-driving vehicle. This requires very reliable and very fast communication between different self-driving vehicles and between an automobile and an infrastructure. In the future, the self-driving vehicle will perform all driving activities, and a driver will focus on only a traffic problem that cannot be identified by the vehicle itself. The technical requirement of the self-driving vehicle requires ultra-low latency and ultra-fast reliability to increase traffic safety to a level that cannot be achieved by a person.

Smart cities and smart homes, referred to as smart societies, will be embedded in a high-density wireless sensor network. A distributed network of an intelligent sensor will identify conditions for cost- and energy-efficient maintenance of the city or the home. Similar settings may be made for each home. A temperature sensor, a window and heating controller, a burglar alarm and home appliances are wirelessly connected to each other. Many of the sensors are typically low in data transmission speed, power and cost. However, for example, real-time HD video may be required in a certain type of device for surveillance.

The consumption and distribution of energy, including heat or gas, are highly distributed, so that the automated control of the distributed sensor network is required. The smart grid interconnects the sensors using digital information and communication technology to collect information and behave accordingly. Since this information may include the behavior of suppliers and consumers, the smart grid may enhance efficiency, reliability, economic efficiency, the sustainability of production and the automated distribution of fuels, such as electricity. The smart grid may be another sensor network with low latency.

A health sector retains many application programs to benefit from mobile communication. The communication system may support telemedicine to provide clinic treatment at a remote site. This may help reduce a barrier to a distance, and may improve access to medical services that are not continuously used in remote rural area. This is also used to save lives in critical treatment and emergencies. A mobile-communication-based wireless sensor network may provide remote monitoring and sensors for parameters such as a heart rate and blood pressure.

Wireless and mobile communication becomes increasingly important in industrial applications. Wiring is high in installation and maintenance cost. Therefore, a possibility of replacing cables with reconfigurable wireless links is an attractive occasion in many industrial fields. However, in order to achieve it, it is required that the wireless connection operates with latency, reliability and capacities similar to those of the cable and that maintenance of the wireless connection is simplified. The low latency and very low error probability are new requirements that need to be connected to 5G.

Logistics and freight tracking are an important use case for mobile communication to enable the tracking of an inventory and a package anywhere using a position-based information system. The use case of the logistics and the freight tracking typically requires a low data rate but needs a wide range and reliable position information.

The present invention that will be described later in this specification may be implemented by combining or changing embodiments to satisfy the above-described requirements of 5G.

Referring to FIG. 1, an AI system connects at least one of an AI server 20, a robot 11, an autonomous vehicle 12, an XR device 13, a smartphone 14 or a home appliance 15 to a cloud network 10. Here, the robot 11, the autonomous vehicle 12, the XR device 13, the smartphone 14 or the home appliance 15 to which the AI technology is applied may be referred to as AI devices 11 to 15.

The cloud network 10 may mean a network that forms a part of a cloud computing infrastructure or exists in the cloud computing infrastructure. Here, the cloud network 10 may be configured using a 3G network, a 4G or a Long Term Evolution (LTE) network or a 5G network or the like.

That is, the devices 11 to 15 and 20 constituting the AI system may be connected to each other through the cloud network 10. Particularly, the devices 11 to 15 and 20 may communicate with each other through a base station, and may directly communicate with each other without the base station.

The AI server 20 may include a server that performs AI processing and a server that performs calculation on big data.

The AI server 20 may be connected to at least one of the robot 11, the autonomous vehicle 12, the XR device 13, the smartphone 14 or the home appliance 15 that are the AI devices constituting the AI system through the cloud network 10, and may help at least some of the AI processing of the connected AI devices 11 to 15.

In this regard, the AI server 20 may learn an artificial neural network according to a machine learning algorithm instead of the AI devices 11 to 15, and may directly store a learning model or may transmit it to the AI devices 11 to 15.

In this regard, the AI server 20 may receive input data from the AI devices 11 to 15, may infer a result value from the received input data using a learning model, may generate a response or a control instruction based on the inferred result value, and may transmit it to the AI devices 11 to 15.

Alternatively, the AI devices 11 to 15 may directly infer the result value from the input data using the learning model, and may generate the response or the control instruction based on the inferred result value.

<AI+Robot>

The robot 11 may be implemented as a guide robot, a transport robot, a cleaning robot, a wearable robot, an entertainment robot, a pet robot, an unmanned aerial robot and the like by applying the AI technology.

The robot 11 may include a robot control module to control an operation, and the robot control module may mean a software module or a chip implementing it as hardware.

The robot 11 may acquire status information of the robot 11 using sensor information acquired from various kinds of sensors, may detect (recognize) surrounding environment and an object, may generate map data, may determine a travel path and a driving plan, may determine a response to a user interaction, or may determine an operation.

Here, the robot 11 may use sensor information acquired from at least one sensor among lidar, radar and a camera to determine a travel path and a driving plan.

The robot 11 may perform the above-described operations by using the learning model composed of at least one artificial neural network. For instance, the robot 11 may recognize the surrounding environment and the object using the learning model, and may determine an operation using the recognized surrounding environment information or object information. Here, the learning model may be learned directly by the robot 11 or learned by an external device such as the AI server 20.

In this regard, the robot 11 may perform the operation by directly generating the result using the learning model, but may perform the operation by transmitting the sensor information to the external device such as the AI server 20 and then receiving the generated result.

The robot 11 may determine the travel path and the driving plan using at least one of map data, object information detected from sensor information or object information obtained from the external device, and may control a drive unit to drive the robot 11 according to the determined travel path and driving plan.

The map data may include object identifying information about various objects disposed in a space where the robot 11 moves. For instance, the map data may include the object identifying information about fixed objects such as a wall or a door and movable objects such as a flower pot or a desk. Furthermore, the object identifying information may include a name, a kind, a distance, a position and the like.

Furthermore, the robot 11 may perform the operation or may be driven by controlling the drive unit based on a user's control/interaction. In this regard, the robot 11 may acquire intention information of interaction depending on a user's action or the utterance of voice, and may determine a response based on the acquired intention information to perform the operation.

<AI+Autonomous Driving>

The autonomous vehicle 12 may be implemented as a movable robot, a vehicle, an unmanned aerial vehicle or the like by applying the AI technology.

The autonomous vehicle 12 may include an autonomous driving control module for controlling an autonomous driving function, and the autonomous driving control module may mean a software module or a chip implementing it as hardware. The autonomous driving control module may be included in the autonomous vehicle 12 as a component thereof, but may be provided outside the autonomous vehicle 12 as separate hardware and then be connected to the autonomous vehicle.

The autonomous vehicle 12 may acquire status information of the autonomous vehicle 12 using sensor information acquired from various kinds of sensors, may detect (recognize) surrounding environment and an object, may generate map data, may determine a travel path and a driving plan, or may determine an operation.

Here, the autonomous vehicle 12 may use sensor information acquired from at least one sensor among lidar, radar and a camera, similarly to the robot 11, to determine a travel path and a driving plan.

Particularly, the autonomous vehicle 12 may recognize an object or environment for an area that blocks view or an area extending over a certain distance by receiving sensor information from external devices, or may receive information recognized directly from the external devices.

The autonomous vehicle 12 may perform the above-described operations using the learning model composed of at least one artificial neural network. For instance, the autonomous vehicle 12 may recognize surrounding environment and an object using the learning model, and may determine a driving trajectory using the recognized surrounding environment information or object information. Here, the learning model may be learned directly by the autonomous vehicle 12 or by the external device such as the AI server 20.

In this regard, the autonomous vehicle 12 may perform an operation by directly generating the result using the learning model, but the autonomous vehicle may perform the operation by transmitting the sensor information to the external device such as the AI server 20 and then receiving the result generated therefrom.

The autonomous vehicle 12 may determine the travel path and the driving plan using at least one of the map data, the object information detected from the sensor information or the object information acquired from the external device, and may control the drive unit to drive the autonomous vehicle 12 according to the determined travel path and driving plan.

The map data may include object identifying information about various objects disposed in a space (e.g. road) where the autonomous vehicle 12 moves. For instance, the map data may include the object identifying information about fixed objects such as a streetlight, rock or a building and movable objects such as a vehicle or a pedestrian. Furthermore, the object identifying information may include a name, a kind, a distance, a position and the like.

Furthermore, the autonomous vehicle 12 may perform the operation or may be driven by controlling the drive unit based on a user's control/interaction. In this regard, the autonomous vehicle 12 may acquire intention information of interaction depending on a user's action or the utterance of voice, and may determine a response based on the acquired intention information to perform the operation.

<AI+XR>

The XR device 13 may be implemented as a Head-Mount Display (HMD), a Head-Up Display (HUD) provided in a vehicle, a television, a mobile phone, a smartphone, a computer, a wearable device, a home appliance, a digital signage, a vehicle, a fixed robot or a movable robot or the like by applying the AI technology.

The XR device 13 may acquire information about a peripheral space or a real object by analyzing 3D point cloud data or image data acquired through various sensors or from an external device and generating position data and attribute data about 3D points, and then may output an XR object by rendering. For instance, the XR device 13 may output the XR object including additional information about the recognized object in response to the recognized object.

The XR device 13 may perform the above-described operations using the learning model composed of at least one artificial neural network. For instance, the XR device 13 may recognize a real object from the 3D point cloud data or the image data using the learning model, and may provide information corresponding to the recognized real object. Here, the learning model may be learned directly by the XR device 13 or by the external device such as the AI server 20.

In this regard, the XR device 13 may perform an operation by directly generating the result using the learning model, but the XR device may perform the operation by transmitting the sensor information to the external device such as the AI server 20 and then receiving the result generated therefrom.

<AI+Robot+Autonomous Driving>

The robot 11 may be implemented as a guide robot, a transport robot, a cleaning robot, a wearable robot, an entertainment robot, a pet robot, an unmanned aerial robot and the like by applying the AI technology and autonomous driving technology.

The robot 11 to which both the AI technology and the autonomous driving technology are applied may mean a robot itself having an autonomous driving function, or a robot 11 interacting with the autonomous vehicle 12.

The robot 11 having the autonomous driving function may generally refer to devices that move by themselves along a given moving trajectory without a user's control or determine the moving trajectory by themselves and then move along the moving trajectory.

The robot 11 having the autonomous driving function and the autonomous vehicle 12 may use a common sensing method to determine one or more of a travel path or a driving plan. For example, the robot 11 having the autonomous driving function and the autonomous vehicle 12 may determine one or more of the travel path or the driving plan using information sensed through lidar, radar, and a camera.

While the robot 11 interacting with the autonomous vehicle 12 being provided separately from the autonomous vehicle 100b, 100a, the robot may be associated with the autonomous driving function inside or outside the autonomous vehicle 12, or may perform an operation associated with a user getting on the autonomous vehicle 12.

In this regard, the robot 11 interacting with the autonomous vehicle 12 may acquire sensor information instead of the autonomous vehicle 12 to provide it to the autonomous vehicle 12, or may acquire sensor information and may generate surrounding environment information or object information to provide it to the autonomous vehicle 12, thus controlling or assisting the autonomous driving function of the autonomous vehicle 12.

Alternatively, the robot 11 interacting with the autonomous vehicle 12 may control the function of the autonomous vehicle 12 by monitoring a user getting on the autonomous vehicle 12 or through interaction with the user. For instance, when it is determined that a driver is in a drowsy state, the robot 11 may activate the autonomous driving function of the autonomous vehicle 12 or may assist in controlling the driver unit of the autonomous vehicle 12. Here, the function of the autonomous vehicle 12 controlled by the robot 11 may include not only an autonomous driving function but also a function provided by a navigation system or an audio system provided in the autonomous vehicle 12.

Alternatively, the robot 11 interacting with the autonomous vehicle 12 may provide information to the autonomous vehicle 12 or assist the function outside the autonomous vehicle 12. For instance, the robot 11 may provide traffic information including signal information to the autonomous vehicle 12, like a smart traffic light, and may interact with the autonomous vehicle 12 to automatically connect an electric charger to a charging port, like an automatic electric charger of the electric vehicle.

<AI+Robot+XR>

The robot 11 may be implemented as a guide robot, a transport robot, a cleaning robot, a wearable robot, an entertainment robot, a pet robot, an unmanned aerial robot, a drone and the like by applying the AI technology and the XR technology.

The robot 11 to which the XR technology is applied may mean a robot that is to be controlled/interact in an XR image. In this case, the robot 11 may be distinguished from the XR device 13 and may be operated in conjunction with the XR device.

If the robot 11 that is to be controlled/interact in the XR image acquires sensor information from sensors including a camera, the robot 11 or the XR device 13 may generate the XR image based on the sensor information, and the XR device 13 may output the generated XR image. Furthermore, such a robot 11 may be operated based on a control signal input through the XR device 13 or a user's interaction.

For instance, the user may check the XR image corresponding to a viewpoint of the robot 11 remotely linked through an external device such as the XR device 13, and may adjust the autonomous driving path of the robot 11 through the interaction, may control an operation or driving, or may check information of a surrounding object.

<AI+Autonomous Driving+XR>

The autonomous vehicle 12 may be implemented as a movable robot, a vehicle, an unmanned aerial vehicle and the like by applying the AI technology and the XR technology.

The autonomous vehicle 12 to which the XR technology is applied may mean an autonomous vehicle having a means for providing an XR image, or an autonomous vehicle that is to be controlled/interact in the XR image. Particularly, the autonomous vehicle 12 that is to be controlled/interact in the XR image may be distinguished from the XR device 13 and may be operated in conjunction with the XR device.

The autonomous vehicle 12 having the means for providing the XR image may acquire sensor information from sensors including a camera, and may output the generated XR image based on the acquired sensor information. For instance, the autonomous vehicle 12 is provided with the HUD to output the XR image, thus providing a real object or an XR object corresponding to an object in a screen to a passenger.

In this regard, when the XR object is output to the HUD, at least a part of the XR object may be output to overlap the actual object to which a passenger's eyes are directed. On the other hand, when the XR object is output to a display provided in the autonomous vehicle 12, at least a part of the XR object may be output to overlap the object in the screen. For instance, the autonomous vehicle 12 may output XR objects corresponding to an object such as a road, another vehicle, a traffic light, a traffic sign, a two-wheeled vehicle, a pedestrian, a building and the like.

If the autonomous vehicle 12 that is to be controlled/interact in the XR image acquires sensor information from the sensors including the camera, the autonomous vehicle 12 or the XR device 13 may generate the XR image based on the sensor information, and the XR device 13 may output the generated XR image. Furthermore, such an autonomous vehicle 12 may be operated based on the control signal input through the external device such as the XR device 13 or the user's interaction.

[Extended Reality Technology]

An extended reality (XR) may collectively refer to virtual reality (VR), augmented reality (AR), and mixed reality (MR). The VR technology provides an object or a background of a real world only in a CG image, the AR technology provides a virtual CG image on a real object image, and the MR technology is computer graphic technology where virtual objects are mixed and combined with the real world.

The MR technology is similar to the AR technology in that it shows both the real object and the virtual object. However, the AR technology is different from the MR technology in that the virtual object is used to complement the real object in the AR technology, whereas the virtual object and the real object are used in an equivalent nature in the MR technology.

The XR technology may be applied to a Head-Mount Display (HMD), a Head-Up Display (HUD), a mobile phone, a tablet PC, a laptop, a desktop, a TV, a digital signage and the like, and a device to which the XR technology is applied may be referred to as the XR device.

A. Example of Block Diagram of UE and 5G Network

Figure 2:
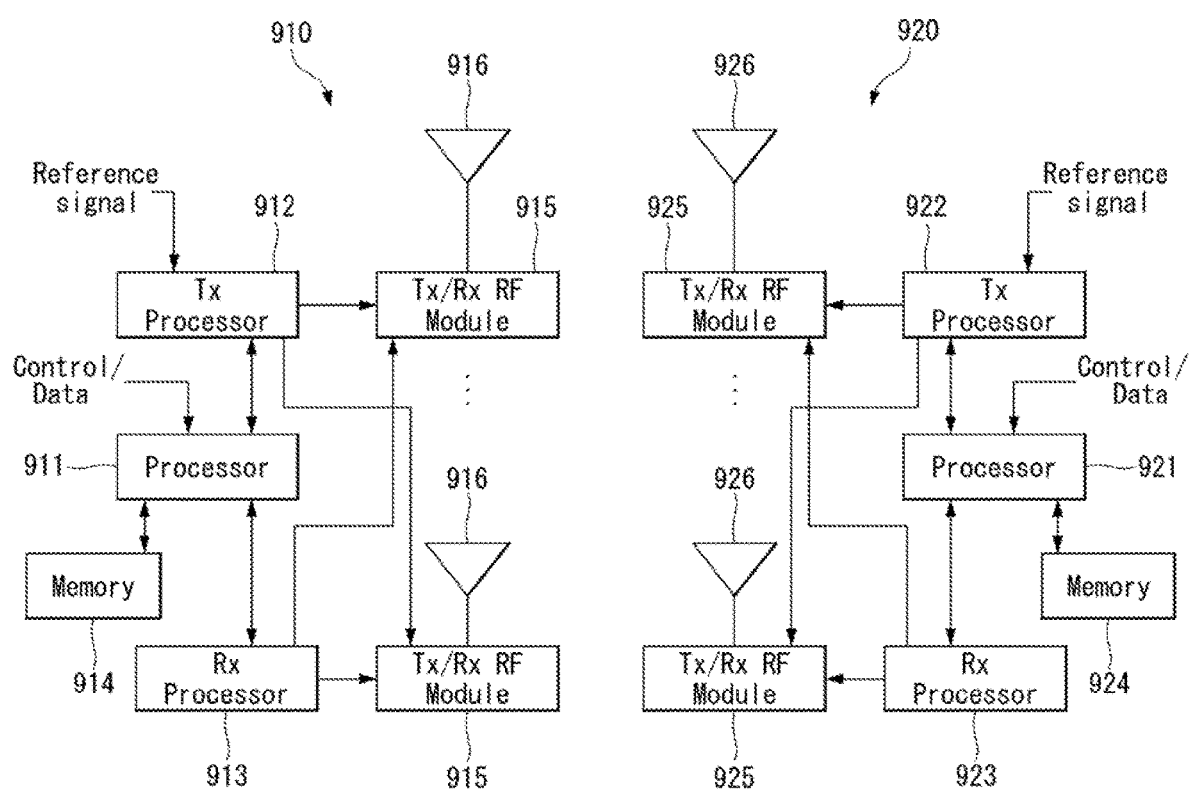
FIG. 2 illustrates a block diagram of a wireless communication system to which methods proposed in the disclosure are applicable.

FIG. 2 is a block diagram of a wireless communication system to which methods proposed in the disclosure are applicable.

Referring to FIG. 2, a device (autonomous device) including an autonomous module is defined as a first communication device (910 of FIG. 2), and a processor 911 can perform detailed autonomous operations.

A 5G network including another vehicle communicating with the autonomous device is defined as a second communication device (920 of FIG. 2), and a processor 921 can perform detailed autonomous operations.

The 5G network may be represented as the first communication device and the autonomous device may be represented as the second communication device.

For example, the first communication device or the second communication device may be a base station, a network node, a transmission terminal, a reception terminal, a wireless device, a wireless communication device, an autonomous device, or the like.

For example, the first communication device or the second communication device may be a base station, a network node, a transmission terminal, a reception terminal, a wireless device, a wireless communication device, a vehicle, a vehicle having an autonomous function, a connected car, a drone (Unmanned Aerial Vehicle, UAV), and AI (Artificial Intelligence) module, a robot, an AR (Augmented Reality) device, a VR (Virtual Reality) device, an MR (Mixed Reality) device, a hologram device, a public safety device, an MTC device, an IoT device, a medical device, a Fin Tech device (or financial device), a security device, a climate/environment device, a device associated with 5G services, or other devices associated with the fourth industrial revolution field.

For example, a terminal or user equipment (UE) may include a cellular phone, a smart phone, a laptop computer, a digital broadcast terminal, personal digital assistants (PDAs), a portable multimedia player (PMP), a navigation device, a slate PC, a tablet PC, an ultrabook, a wearable device (e.g., a smartwatch, a smart glass and a head mounted display (HMD)), etc. For example, the HMD may be a display device worn on the head of a user. For example, the HMD may be used to realize VR, AR or MR. For example, the drone may be a flying object that flies by wireless control signals without a person therein. For example, the VR device may include a device that implements objects or backgrounds of a virtual world. For example, the AR device may include a device that connects and implements objects or background of a virtual world to objects, backgrounds, or the like of a real world. For example, the MR device may include a device that unites and implements objects or background of a virtual world to objects, backgrounds, or the like of a real world. For example, the hologram device may include a device that implements 360-degree 3D images by recording and playing 3D information using the interference phenomenon of light that is generated by two lasers meeting each other which is called holography. For example, the public safety device may include an image repeater or an imaging device that can be worn on the body of a user. For example, the MTC device and the IoT device may be devices that do not require direct interference or operation by a person. For example, the MTC device and the IoT device may include a smart meter, a bending machine, a thermometer, a smart bulb, a door lock, various sensors, or the like. For example, the medical device may be a device that is used to diagnose, treat, attenuate, remove, or prevent diseases. For example, the medical device may be a device that is used to diagnose, treat, attenuate, or correct injuries or disorders. For example, the medial device may be a device that is used to examine, replace, or change structures or functions. For example, the medical device may be a device that is used to control pregnancy. For example, the medical device may include a device for medical treatment, a device for operations, a device for (external) diagnose, a hearing aid, an operation device, or the like. For example, the security device may be a device that is installed to prevent a danger that is likely to occur and to keep safety. For example, the security device may be a camera, a CCTV, a recorder, a black box, or the like. For example, the Fin Tech device may be a device that can provide financial services such as mobile payment.

Referring to FIG. 2, the first communication device 910 and the second communication device 920 include processors 911 and 921, memories 914 and 924, one or more Tx/Rx radio frequency (RF) modules 915 and 925, Tx processors 912 and 922, Rx processors 913 and 923, and antennas 916 and 926. The Tx/Rx module is also referred to as a transceiver. Each Tx/Rx module 915 transmits a signal through each antenna 926. The processor implements the aforementioned functions, processes and/or methods. The processor 921 may be related to the memory 924 that stores program code and data. The memory may be referred to as a computer-readable medium. More specifically, the Tx processor 912 implements various signal processing functions with respect to L1 (i.e., physical layer) in DL (communication from the first communication device to the second communication device). The Rx processor implements various signal processing functions of L1 (i.e., physical layer).

UL (communication from the second communication device to the first communication device) is processed in the first communication device 910 in a way similar to that described in association with a receiver function in the second communication device 920. Each Tx/Rx module 925 receives a signal through each antenna 926. Each Tx/Rx module provides RF carriers and information to the Rx processor 923. The processor 921 may be related to the memory 924 that stores program code and data. The memory may be referred to as a computer-readable medium.

B. Signal Transmission/Reception Method in Wireless Communication System

Figure 3:
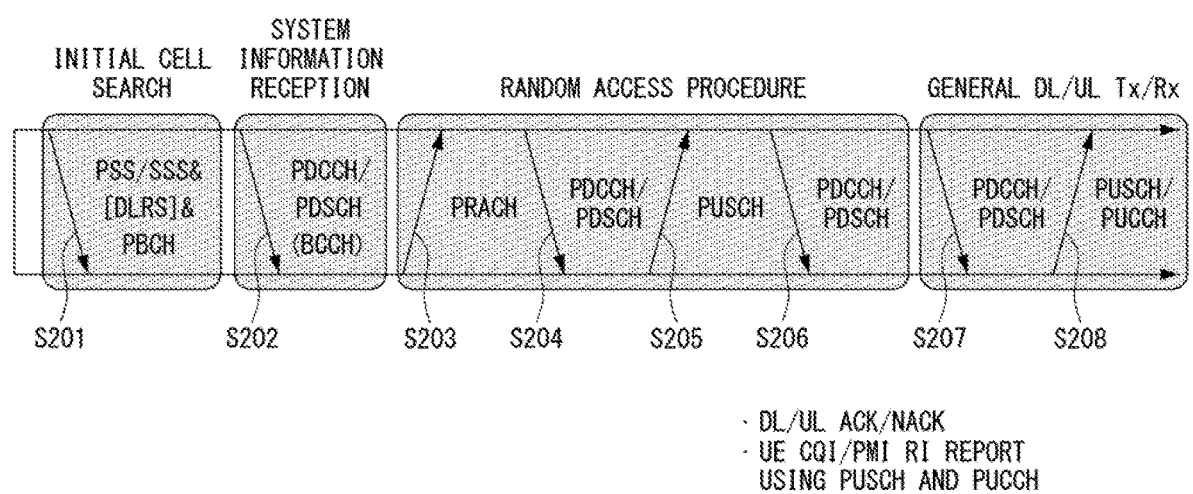
FIG. 3 is a diagram showing an example of a signal transmission/reception method in the wireless communication system.

FIG. 3 is a diagram showing an example of a signal transmission/reception method in the wireless communication system.

To be more specific, FIG. 3 illustrates physical channels used in a 3GPP system and general signal transmission. In the wireless communication system, a terminal receives information from a base station through a downlink DL, and the terminal transmits information to the base station through an uplink UL. The information transmitted and received by the base station and the terminal includes data and various pieces of control information, and various physical channels are present depending on the kind/purpose of the transmitted and received information.

Referring to FIG. 3, when the terminal is powered on or enters a cell newly, the terminal performs an initial cell search operation to synchronize with the base station at step S201. To this end, the terminal may receive a primary synchronization signal (PSS) and a secondary synchronization signal (SSS) from the base station to synchronize with the base station, and may acquire information such as a cell ID. Subsequently, the terminal may receive a Physical Broadcast Channel (PBCH) from the base station to acquire the broadcast information in the cell. Meanwhile, the terminal may receive a downlink reference signal (DL RS) at the initial cell search step to check a downlink channel status.

After completing the initial cell search, the terminal may acquire more specific system information by receiving a Physical Downlink Control Channel (PDCCH) and a Physical Downlink Shared Channel (PDSCH) according to the information on the PDCCH at step S202.

Meanwhile, in the case of accessing to the base station for the first time or having no wireless resource for signal transmission, the terminal may perform a Random Access Procedure (RACH) for the base station at steps S203 to S206. To this end, the terminal may transmit a specific sequence through a Physical Random Access Channel (PRACH) to a preamble at steps S203 and S205, and may receive a response message (Random Access Response (RAR) message) to the preamble through the PDCCH and the corresponding PDSCH. In the case of a contention-based RACH, a contention resolution procedure may be further performed at step S206.

The terminal performing the above-described procedure may subsequently perform PDCCH/PDSCH reception (S207) and Physical Uplink Shared Channel (PUSCH)/Physical Uplink Control Channel (PUCCH) transmission (S208) as a general up/downlink signal transmission procedure. Particularly, the terminal may receive Downlink Control Information (DCI) through the PDCCH. Here, the DCI includes control information such as resource allocation information for the terminal, and a different format may be applied thereto according to the purpose of use.

Meanwhile, the control information transmitted through the uplink to the base station by the terminal or received from the base station by the terminal may include a downlink/uplink ACK/NACK signal, a Channel Quality Indicator (CQI), a Precoding Matrix index (PMI), a Rank Indicator (RI) and the like. The terminal may transmit control information such as the above-described CQI/PMI/RI through the PUSCH and/or the PUCCH.

The UE monitors a set of PDCCH candidates at monitoring occasions configured for one or more control element sets (CORESET) on a serving cell depending on corresponding search space configurations. The set of PDCCH candidates to be monitored by the UE may be defined in terms of search space sets, which may be a common search space set or a UE-specific search space set. The CORESET is composed of a set of (physical) resource blocks having time duration of 1 to 3 OFDM symbols. The network may be configured so that the UE has a plurality of CORESETs. The UE monitors the PDCCH candidates in one or more search space sets. Here, the term "monitoring" means an attempt to decode the PDCCH candidate(s) in the search space. If the UE succeeds in decoding one of the PDCCH candidates in the search space, the UE determines that the PDCCH is detected in the corresponding PDCCH candidate, and the reception of the PDSCH or the transmission of the PUSCH is performed based on the DCI in the detected PDCCH. The PDCCH may be used to schedule the DL transmissions on the PDSCH and the UL transmissions on the PUSCH. Here, the DCI on the PDCCH may include a modulation and coding format related to the downlink shared channel, a modulation and coding format related to a downlink assignment (i.e. downlink grant; DL grant) including at least resource allocation information or the uplink shared channel, and an uplink grant (UL grant) including the resource allocation information.

The initial access (IA) procedure in the 5G communication system will be further described with reference to FIG. 3.

The UE may perform cell search, system information acquisition, beam alignment for the initial access, DL measurement and the like based on SSB. The SSB is mixed with a Synchronization Signal/Physical Broadcast channel (SS/PBCH) block.

The SSB is composed of PSS, SSS and PBCH. The SSB is composed of four consecutive OFDM symbols, and the PSS, PBCH, SSS/PBCH or PBCH is transmitted to each OFDM symbol. Each of the PSS and the SSS is composed of one OFDM symbol and 127 subcarriers, and the PBCH is composed of three OFDM symbol and 576 subcarriers.

The cell search means a process in which the UE acquires time/frequency synchronization of the cell and detects the cell ID (Identifier) (e.g. Physical layer Cell ID (PCI)). The PSS is used to detect the cell ID in the cell ID group, and the SSS is used to detect the cell ID group. The PBCH is used to detect an SSB (time) index and to detect a half-frame.

There are 336 cell ID groups, and three cell IDs are present for each cell ID group. There are a total of 1008 cell IDs. Information about the cell ID group to which the cell ID of the cell belongs is provided/acquired through the SSS of the cell, and information about the cell ID among 336 cells in the cell ID is provided/acquired through the PSS.

The SSB is periodically transmitted according to an SSB periodicity. The SSB basic periodicity assumed by the UE during the initial cell search is defined as 20 ms. After the cell access, the SSB periodicity may be set as one of 5 ms, 10 ms, 20 ms, 40 ms, 80 ms, and 160 ms by a network (e.g. BS).

Next, the system information (SI) acquisition will be described.

The SI is divided into a master information block (MIB) and a plurality of system information blocks (SIB). The SI other than the MIB may be referred to as Remaining Minimum System Information (RMSI). The MIB includes information/parameter for monitoring the PDCCH that schedules the PDSCH carrying the System Information Block1 (SIB1), and is transmitted by the BS through the PBCH of the SSB. The SIB1 includes information about the availability and the scheduling (e.g. transmission periodicity, SI-window size) of the remaining SIBs (hereinafter SIBx, where x is an integer of 2 or more). The SIBx is included in the SI message and is transmitted through the PDSCH. Each SI message is transmitted within a periodically occurring time window (i.e. SI-window).

A random access (RA) procedure in the 5G communication system will be further described with reference to FIG. 3.

The random access procedure is used for various purposes. For example, the random access procedure may be used for initial network access, handover, UE-triggered UL data transmission. The UE may acquire UL synchronization and UL transmission resources through the random access procedure. The random access procedure is classified into a contention-based random access procedure and a contention-free random access procedure. A detailed procedure of the contention-based random access procedure is as follows.

The UE may transmit a random access preamble as Msg1 of the random access procedure in the UL through the PRACH. Random access preamble sequences with two different lengths are supported. The long sequence length 839 is applied to a subcarrier spacing of 1.25 and 5 kHz, while the short sequence length 139 is applied to a subcarrier spacing of 15, 30, 60 and 120 kHz.

If the BS receives the random access preamble from the UE, the BS transmits the random access response (RAR) message (Msg2) to the UE. The PDCCH for scheduling the PDSCH carrying the RAR is CRC masked with a random access (RA) radio network temporary identifier (RNTI) (RA-RNTI) and then transmitted. The UE detecting the PDCCH masked with the RA-RNTI may receive the RAR from the PDSCH scheduled by the DCI carried by the PDCCH. The UE checks whether the random access response information about the preamble transmitted by the UE, that is, the Msg1 is in the RAR or not. The presence or absence of the random access information about the Msg1 transmitted by the UE may be determined by the presence or absence of the random access preamble ID about the preamble transmitted by the UE. If there is no response to the Msg1, the UE may re-transmit the RACH preamble within a predetermined number of times while performing power ramping. The UE calculates the PRACH transmission power for the re-transmission of the preamble based on the most recent path loss and power ramping counter.

The UE may perform the UL transmission on the uplink shared channel as the Msg3 of the random access procedure based on the random access response information. The Msg3 may include a RRC connection request and an UE identifier. As the response to the Msg3, the network may transmit the Msg4, which may be handled as a contention resolution message on the DL. By receiving the Msg4, the UE may enter a RRC connected status.

C. Beam Management (BM) Procedure of 5G Communication System

A BM procedure can be divided into (1) a DL MB procedure using an SSB or a CSI-RS and (2) a UL BM procedure using a sounding reference signal (SRS). In addition, each BM procedure can include Tx beam swiping for determining a Tx beam and Rx beam swiping for determining an Rx beam.

The DL BM procedure using an SSB will be described.

Configuration of a beam report using an SSB is performed when channel state information (CSI)/beam is configured in RRC_CONNECTED.

A UE receives a CSI-ResourceConfig IE including CSI-SSB-ResourceSetList for SSB resources used for BM from a BS. The RRC parameter "csi-SSB-ResourceSetList" represents a list of SSB resources used for beam management and report in one resource set. Here, an SSB resource set can be set as {SSBx1, SSBx2, SSBx3, SSBx4, . . . }. An SSB index can be defined in the range of 0 to 63.

The UE receives the signals on SSB resources from the BS on the basis of the OSI-S SB-ResourceSetList.

When CSI-RS reportConfig with respect to a report on SSBRI and reference signal received power (RSRP) is set, the UE reports the best SSBRI and RSRP corresponding thereto to the BS. For example, when reportQuantity of the CSI-RS reportConfig IE is set to 'ssb-Index-RSRP', the UE reports the best SSBRI and RSRP corresponding thereto to the BS.

When a CSI-RS resource is configured in the same OFDM symbols as an SSB and 'QCL-TypeD' is applicable, the UE can assume that the CSI-RS and the SSB are quasi co-located (QCL) from the viewpoint of 'QCL-TypeD'. Here, QCL-TypeD may mean that antenna ports are quasi co-located from the viewpoint of a spatial Rx parameter. When the UE receives signals of a plurality of DL antenna ports in a QCL-TypeD relationship, the same Rx beam can be applied.

Next, a DL BM procedure using a CSI-RS will be described.

An Rx beam determination (or refinement) procedure of a UE and a Tx beam swiping procedure of a BS using a CSI-RS will be sequentially described. A repetition parameter is set to 'ON' in the Rx beam determination procedure of a UE and set to 'OFF' in the Tx beam swiping procedure of a BS.

First, the Rx beam determination procedure of a UE will be described.

The UE receives an NZP CSI-RS resource set IE including an RRC parameter with respect to 'repetition' from a BS through RRC signaling. Here, the RRC parameter 'repetition' is set to 'ON'.

The UE repeatedly receives signals on resources in a CSI-RS resource set in which the RRC parameter 'repetition' is set to 'ON' in different OFDM symbols through the same Tx beam (or DL spatial domain transmission filters) of the BS.

The UE determines an RX beam thereof.

The UE skips a CSI report. That is, the UE can skip a CSI report when the RRC parameter 'repetition' is set to 'ON'.

Next, the Tx beam determination procedure of a BS will be described.

A UE receives an NZP CSI-RS resource set IE including an RRC parameter with respect to 'repetition' from the BS through RRC signaling. Here, the RRC parameter 'repetition' is related to the Tx beam swiping procedure of the BS when set to 'OFF'.

The UE receives signals on resources in a CSI-RS resource set in which the RRC parameter 'repetition' is set to 'OFF' in different DL spatial domain transmission filters of the BS.

The UE selects (or determines) a best beam.

The UE reports an ID (e.g., CRI) of the selected beam and related quality information (e.g., RSRP) to the BS. That is, when a CSI-RS is transmitted for BM, the UE reports a CRI and RSRP with respect thereto to the BS.

Next, the UL BM procedure using an SRS will be described.

A UE receives RRC signaling (e.g., SRS-Config IE) including a (RRC parameter) purpose parameter set to 'beam management" from a BS. The SRS-Config IE is used to set SRS transmission. The SRS-Config IE includes a list of SRS-Resources and a list of SRS-ResourceSets. Each SRS resource set refers to a set of SRS-resources.

The UE determines Tx beamforming for SRS resources to be transmitted on the basis of SRS-SpatialRelation Info included in the SRS-Config IE. Here, SRS-SpatialRelation Info is set for each SRS resource and indicates whether the same beamforming as that used for an SSB, a CSI-RS or an SRS will be applied for each SRS resource.

When SRS-SpatialRelationInfo is set for SRS resources, the same beamforming as that used for the SSB, CSI-RS or SRS is applied. However, when SRS-SpatialRelationInfo is not set for SRS resources, the UE arbitrarily determines Tx beamforming and transmits an SRS through the determined Tx beamforming.

Next, a beam failure recovery (BFR) procedure will be described.

In a beamformed system, radio link failure (RLF) may frequently occur due to rotation, movement or beamforming blockage of a UE. Accordingly, NR supports BFR in order to prevent frequent occurrence of RLF. BFR is similar to a radio link failure recovery procedure and can be supported when a UE knows new candidate beams. For beam failure detection, a BS configures beam failure detection reference signals for a UE, and the UE declares beam failure when the number of beam failure indications from the physical layer of the UE reaches a threshold set through RRC signaling within a period set through RRC signaling of the BS. After beam failure detection, the UE triggers beam failure recovery by initiating a random access procedure in a PCell and performs beam failure recovery by selecting a suitable beam. (When the BS provides dedicated random access resources for certain beams, these are prioritized by the UE). Completion of the aforementioned random access procedure is regarded as completion of beam failure recovery.

D. URLLC (Ultra-Reliable and Low Latency Communication)

URLLC transmission defined in NR can refer to (1) a relatively low traffic size, (2) a relatively low arrival rate, (3) extremely low latency requirements (e.g., 0.5 and 1 ms), (4) relatively short transmission duration (e.g., 2 OFDM symbols), (5) urgent services/messages, etc. In the case of UL, transmission of traffic of a specific type (e.g., URLLC) needs to be multiplexed with another transmission (e.g., eMBB) scheduled in advance in order to satisfy more stringent latency requirements. In this regard, a method of providing information indicating preemption of specific resources to a UE scheduled in advance and allowing a URLLC UE to use the resources for UL transmission is provided.

NR supports dynamic resource sharing between eMBB and URLLC. eMBB and URLLC services can be scheduled on non-overlapping time/frequency resources, and URLLC transmission can occur in resources scheduled for ongoing eMBB traffic. An eMBB UE may not ascertain whether PDSCH transmission of the corresponding UE has been partially punctured and the UE may not decode a PDSCH due to corrupted coded bits. In view of this, NR provides a preemption indication. The preemption indication may also be referred to as an interrupted transmission indication.

With regard to the preemption indication, a UE receives DownlinkPreemption IE through RRC signaling from a BS. When the UE is provided with DownlinkPreemption IE, the UE is configured with INT-RNTI provided by a parameter int-RNTI in DownlinkPreemption IE for monitoring of a PDCCH that conveys DCI format 2_1. The UE is additionally configured with a corresponding set of positions for fields in DCI format 2_1 according to a set of serving cells and positionInDCI by INT-ConfigurationPerServing Cell including a set of serving cell indexes provided by servingCellID, configured having an information payload size for DCI format 2_1 according to dci-Payloadsize, and configured with indication granularity of time-frequency resources according to timeFrequencySect.

The UE receives DCI format 2_1 from the BS on the basis of the DownlinkPreemption IE.

When the UE detects DCI format 2_1 for a serving cell in a configured set of serving cells, the UE can assume that there is no transmission to the UE in PRBs and symbols indicated by the DCI format 2_1 in a set of PRBs and a set of symbols in a last monitoring period before a monitoring period to which the DCI format 2_1 belongs. For example, the UE assumes that a signal in a time-frequency resource indicated according to preemption is not DL transmission scheduled therefor and decodes data on the basis of signals received in the remaining resource region.

E. mMTC (Massive MTC)

mMTC (massive Machine Type Communication) is one of 5G scenarios for supporting a hyper-connection service providing simultaneous communication with a large number of UEs. In this environment, a UE intermittently performs communication with a very low speed and mobility. Accordingly, a main goal of mMTC is operating a UE for a long time at a low cost. With respect to mMTC, 3GPP deals with MTC and NB (NarrowBand)-IoT.

mMTC has features such as repetitive transmission of a PDCCH, a PUCCH, a PDSCH (physical downlink shared channel), a PUSCH, etc., frequency hopping, retuning, and a guard period.

That is, a PUSCH (or a PUCCH (particularly, a long PUCCH) or a PRACH) including specific information and a PDSCH (or a PDCCH) including a response to the specific information are repeatedly transmitted. Repetitive transmission is performed through frequency hopping, and for repetitive transmission, (RF) retuning from a first frequency resource to a second frequency resource is performed in a guard period and the specific information and the response to the specific information can be transmitted/received through a narrowband (e.g., 6 resource blocks (RBs) or 1 RB).

F. Basic Operation Between AI Using 5G Communication

Figure 4:
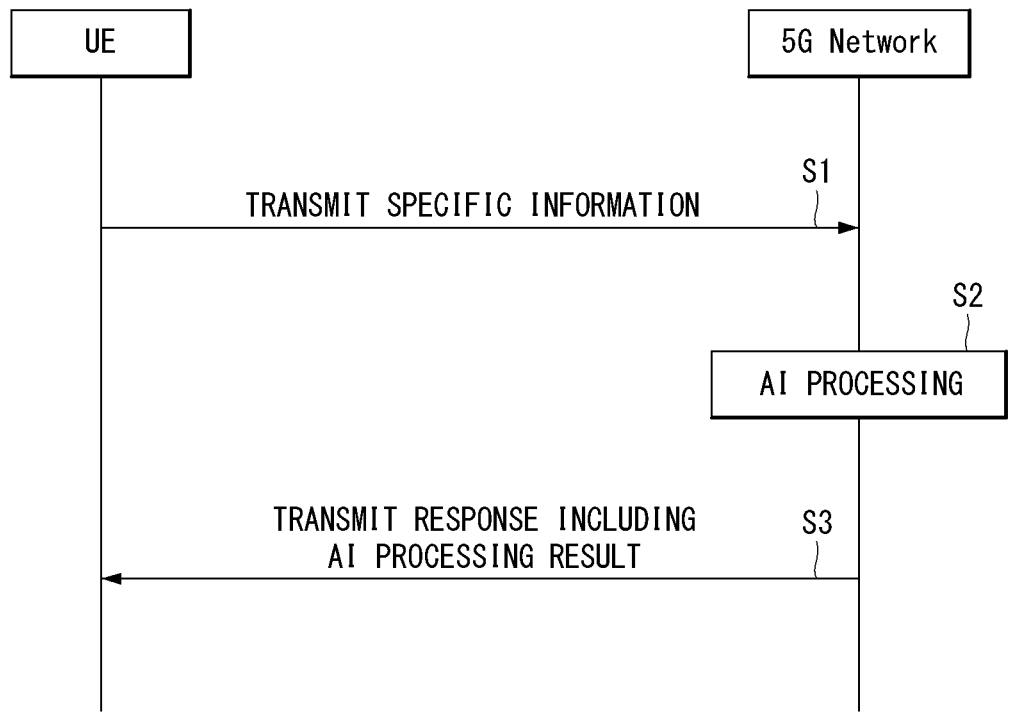
FIG. 4 shows an example of a basic operation of a user terminal and a 5G network in a 5G communication system.

FIG. 4 shows an example of basic operations of an UE and a 5G network in a 5G communication system.

The UE transmits specific information to the 5G network (S1). The specific information may include autonomous driving related information. In addition, the 5G network can determine whether to remotely control the vehicle (S2). Here, the 5G network may include a server or a module which performs remote control related to autonomous driving. In addition, the 5G network can transmit information (or signal) related to remote control to the UE (S3).

G. Applied Operations Between UE and 5G Network in 5G Communication System

Hereinafter, the operation of an AI using 5G communication will be described in more detail with reference to wireless communication technology (BM procedure, URLLC, mMTC, etc.) described in FIGS. 2 and 3.

First, a basic procedure of an applied operation to which a method proposed by the present invention which will be described later and eMBB of 5G communication are applied will be described.

As in steps S1 and S3 of FIG. 4, the UE performs an initial access procedure and a random access procedure with the 5G network prior to step S1 of FIG. 4 in order to transmit/receive signals, information and the like to/from the 5G network.

More specifically, the UE performs an initial access procedure with the 5G network on the basis of an SSB in order to acquire DL synchronization and system information. A beam management (BM) procedure and a beam failure recovery procedure may be added in the initial access procedure, and quasi-co-location (QCL) relation may be added in a process in which the UE receives a signal from the 5G network.

In addition, the UE performs a random access procedure with the 5G network for UL synchronization acquisition and/or UL transmission. The 5G network can transmit, to the UE, a UL grant for scheduling transmission of specific information. Accordingly, the UE transmits the specific information to the 5G network on the basis of the UL grant. In addition, the 5G network transmits, to the UE, a DL grant for scheduling transmission of 5G processing results with respect to the specific information. Therefore, the 5G network may transmit a response including the AI processing result to the UE based on the DL grant.

Next, a basic procedure of an applied operation to which a method proposed by the present invention which will be described later and URLLC of 5G communication are applied will be described.

As described above, an UE can receive DownlinkPreemption IE from the 5G network after the UE performs an initial access procedure and/or a random access procedure with the 5G network. Then, the UE receives DCI format 2_1 including a preemption indication from the 5G network on the basis of DownlinkPreemption IE. The UE does not perform (or expect or assume) reception of eMBB data in resources (PRBs and/or OFDM symbols) indicated by the preemption indication. Thereafter, when the UE needs to transmit specific information, the UE can receive a UL grant from the 5G network.

Next, a basic procedure of an applied operation to which a method proposed by the present invention which will be described later and mMTC of 5G communication are applied will be described.

Description will focus on parts in the steps of FIG. 4 which are changed according to application of mMTC.

In step S1 of FIG. 4, the UE receives a UL grant from the 5G network in order to transmit specific information to the 5G network. Here, the UL grant may include information on the number of repetitions of transmission of the specific information and the specific information may be repeatedly transmitted on the basis of the information on the number of repetitions. That is, the UE transmits the specific information to the 5G network on the basis of the UL grant. Repetitive transmission of the specific information may be performed through frequency hopping, the first transmission of the specific information may be performed in a first frequency resource, and the second transmission of the specific information may be performed in a second frequency resource. The specific information can be transmitted through a narrowband of 6 resource blocks (RBs) or 1 RB.

The above-described 5G communication technology can be combined with methods proposed in the present invention which will be described later and applied or can complement the methods proposed in the present invention to make technical features of the methods concrete and clear.

Figure 5:
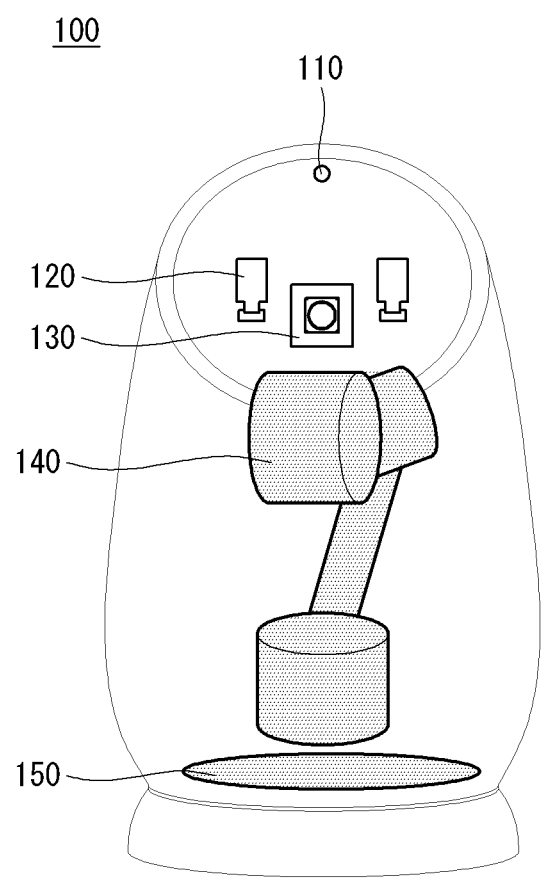
FIG. 5 illustrates an intelligent computing device according to an embodiment of the present invention.

FIG. 5 illustrates an intelligent computing device according to an embodiment of the present invention.

As shown in FIG. 5, an artificial intelligent speaker may be illustrated as an example of the intelligent computing device 100.

The intelligent computing device 100 includes a microphone 110, a display 120, a camera 130, an angle adjuster 140, and a speaker 150.

The microphone 110 may receive a user's voice command from an outside. For example, the microphone 110 may receive from the outside a wakeup word activating the intelligent computing device 100. Here, if the wakeup word is received, the intelligent computing device 100 may wake up. Furthermore, the microphone 110 may receive from the outside a text read command (or TTS output command) that causes the intelligent computing device 100 to convert a text written in an external object into voice and output the voice. Here, if the text read command is received, the intelligent computing device 100 may photograph the text written in the external object, analyze the photographed text to convert it into the voice, and output the voice.

The display 120 may display an image of an eye shape. For example, the display 120 may display the image of the eye shape in a direction where the text is written.

The camera 130 may photograph the external object and the text written in the object.

The angle adjuster 140 may adjust the photographing angle of the camera 130. The angle adjuster 140 may be called a gimbal. The angle adjuster 140 may adjust to fix the photographing angle of the camera 130 to a preset angle.

The speaker 150 may output the converted voice to the outside in the form of sound. For example, the speaker 150 may output the contents of the text as the voice.

Figure 6:
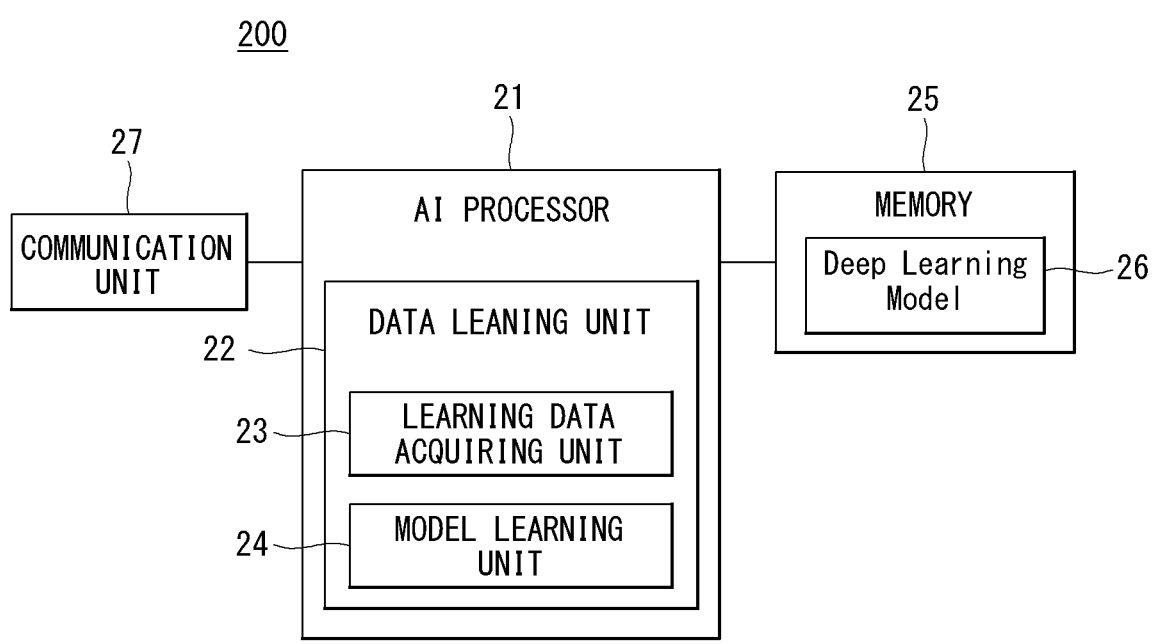
FIG. 6 is a block diagram of an AI device according to an embodiment of the present invention.

FIG. 6 is a block diagram of an AI device according to an embodiment of the present invention.

The AI device 200 may include an electronic device including an AI module that may perform the AI processing or a server including the AI module. Furthermore, the AI device 200 may be included as at least a part of the intelligent computing device 100 shown in FIG. 5 and may be provided to perform at least some of the AI processing together.

The AI processing may include all operations related to the control of the intelligent computing device 100 shown in FIG. 5. For example, the intelligent computing device 100 may AI process the sensing data or the acquired data to perform processing/determination and control signal generation. Furthermore, for example, the intelligent computing device 100 may AI process data received through a communication unit to control the intelligent computing device.

The AI device 200 may be a client device that directly uses the AI processing result, or a device in cloud environment that provides the AI processing result to another device.

The AI device 200 may include an AI processor 21, a memory 25 and/or a communication unit 27.

The AI device 200 is a computing device capable of learning a neural network, and may be implemented as various electronic devices such as a server, a desktop PC, a laptop PC, or a tablet PC.

The AI processor 21 may learn the neural network using a program stored in the memory 25. Particularly, the AI processor 21 may learn the neural network for recognizing data related to the intelligent computing device. For example, the AI processor 21 may extract a characteristic value from the data (e.g. sensing data) related to the intelligent computing device, and may learn the neural network for recommending a book to a user using the characteristic value as an input value. The neural network for recognizing data related to the intelligent computing device may be designed to simulate a human brain structure on a computer, and may include a plurality of weighted network nodes simulating the neuron of the human neural network. The plurality of network nodes may exchange data depending on the connection relationship so that the neuron simulates the synaptic activity of the neuron that exchanges a signal through a synapse. Here, the neural network may include a deep learning model developed from the neural network model. In the deep learning model, the plurality of network nodes may exchange data depending on a convolutional connection relationship while being located at different layers. Examples of the neural network model may include various deep learning techniques, such as deep neural networks (DNN), convolutional deep neural networks (CNN), Recurrent Boltzmann Machines (RNN), Restricted Boltzmann Machines (RBM), deep belief networks (DBN), or deep Q-networks, and may be applied to various fields, such as computer visions, voice recognition, natural language processing, or voice/signal processing.

Meanwhile, the processor performing the above-described function may be a universal processor (e.g., CPU), but may be an AI dedicated processor (e.g., GPU) for artificial intelligent learning.

The memory 25 may store various programs and data needed to operate the AI device 200. The memory 25 may be implemented as a non-volatile memory, a volatile memory, a flash memory, a hard disk drive (HDD) or a solid state drive (SDD). The memory 25 may be accessed by the AI processor 21, and read/write/correction/deletion/update of data may be performed by the AI processor 21. Furthermore, the memory 25 may store a neural network model (e.g., deep learning model 26) generated through a learning algorithm for data classification/recognition according to an embodiment of the present invention.

Meanwhile, the AI processor 21 may include a data learning unit 22 that learns a neural network for data classification/recognition. The data learning unit 22 can learn references about what learning data are used and how to classify and recognize data using the learning data in order to determine data classification/recognition. The data learning unit 22 can learn a deep learning model by acquiring learning data to be used for learning and by applying the acquired learning data to the deep learning model.

The data learning unit 22 may be made in the form of at least one hardware chip and then mounted on the AI device 200. For example, the data learning unit 22 may be made in the form of a dedicated hardware chip for artificial intelligence (AI), or may be made as a part of a universal processor(CPU) or a graphic dedicated processor GPU and then mounted on the AI device 200. Furthermore, the data learning unit 22 may be implemented as a software module. In the case of being implemented as the software module (or program module including an instruction), the software module may be stored in non-transitory computer readable media that are readable by the computer. In this case, at least one software module may be provided by an Operating System (OS) or an application.

The data learning unit 22 may include a learning data acquiring unit 23 and a model learning unit 24.

The learning data acquiring unit 23 may acquire learning data required for the neural network model for classifying and recognizing data. For example, the learning data acquiring unit 23 may be learning data, and may acquire intelligent computing device data and/or sample data, which are input into the neural network model.

The model learning unit 24 can perform learning such that a neural network model has a determination reference about how to classify predetermined data, using the acquired learning data. In this case, the model learning unit 24 can train a neural network model through supervised learning that uses at least some of learning data as a determination reference. Alternatively, the model learning data 24 can train a neural network model through unsupervised learning that finds out a determination reference by performing learning by itself using learning data without supervision. Further, the model learning unit 24 can train a neural network model through reinforcement learning using feedback about whether the result of situation determination according to learning is correct. Further, the model learning unit 24 can train a neural network model using a learning algorithm including error back-propagation or gradient decent.

If the neural network model is learned, the model learning unit 24 may the learned neural network model in the memory. The model learning unit 24 may store the learned neural network model in the memory of the server connected to the AI device 200 via a wired or wireless network.

The data learning unit 22 may further include a learning data preprocessor (not shown) and a learning data selector (not shown) to improve the analysis result of a recognition model or reduce resources or time for generating a recognition model.

The learning data preprocessor can preprocess acquired data such that the acquired data can be used in learning for situation determination. For example, the learning data preprocessor can process acquired data in a predetermined format such that the model learning unit 24 can use learning data acquired for learning for image recognition.

Furthermore, the learning data selector may select data required for learning among learning data acquired by the learning data acquiring unit 23 or the learning data preprocessed from the preprocessor. The selected learning data may be provided to the model learning unit 24. For example, the learning data selector may select only data on the object included in the specific area as the learning data, by detecting the specific area among images acquired through the camera of the intelligent computing device.

Further, the data learning unit 22 may further include a model estimator (not shown) to improve the analysis result of a neural network model.

The model estimator inputs estimation data to a neural network model, and when an analysis result output from the estimation data does not satisfy a predetermined reference, it can make the model learning unit 22 perform learning again. In this case, the estimation data may be data defined in advance for estimating a recognition model. For example, when the number or ratio of estimation data with an incorrect analysis result of the analysis result of a recognition model learned with respect to estimation data exceeds a predetermined threshold, the model estimator can estimate that a predetermined reference is not satisfied.

The communication unit 27 may transmit the AI processing result of the AI processor 21 to the external electronic device.

The external electronic device may include an intelligent computing device, an artificial intelligent speaker, a robot, a drone, an AR device, a mobile device, a home appliance or the like.

By way of example, if the external electronic device is the intelligent computing device, the AI device 200 may be defined as an IoT device communicating with the intelligent computing device, another intelligent computing device or the 5G network. Meanwhile, the AI device 200 may be functionally embedded in the processor provided in the intelligent computing device. Furthermore, the 5G network may include a server or a module that performs the AI processing.

Meanwhile, the AI device 200 shown in FIG. 6 was functionally separately described into the AI processor 21, the memory 25, the communication unit 27, etc., but it should be noted that the aforementioned components may be integrated in one module and referred to as an AI module.

Figure 7:
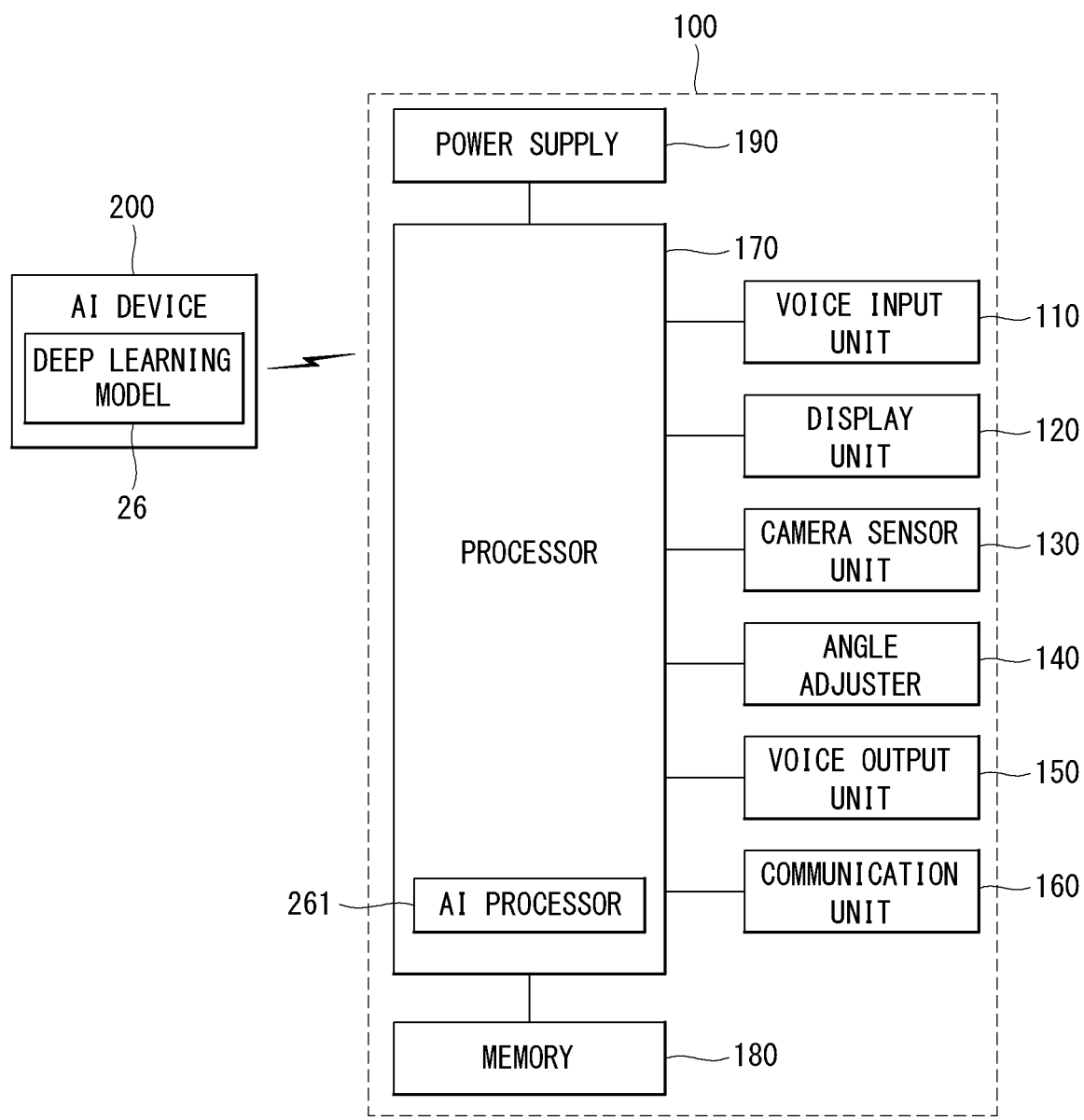
FIG. 7 is a diagram illustrating a system for associating the intelligent computing device with the AI device according to an embodiment of the present invention.

FIG. 7 is a diagram illustrating a system for associating the intelligent computing device with the AI device according to an embodiment of the present invention.

Referring to FIG. 7, the intelligent computing device 100 may transmit data that needs AI processing through the communication unit to the AI device 200, and the AI device 200 including the deep learning model 26 may transmit the AI processing result using the deep learning model 26 to the intelligent computing device 100. The AI device 200 may refer to the description of FIG. 5.

The intelligent computing device 100 may include a microphone (voice input unit) 110, a display (display unit) 120, a camera (camera sensor unit) 130, an angle adjuster 140, and a speaker (voice output unit) 150, which have been described above with reference to FIG. 6. In addition to these components, the intelligent computing device may include an interface unit (not shown), a memory 180, a processor 170, and a power supply 190, and the processor 170 may be further provided with an AI processor 261.

The interface unit may include at least one of a communication module, a terminal, a pin, a cable, a port, a circuit, an element, and a device.

The memory 180 is electrically connected to the processor 170. The memory 180 may store basic data on a unit, control data for controlling the operation of the unit, and input/output data. The memory 180 may store data that is stored in the processor 170. The memory 180 may be configured by at least one of a ROM, a RAM, an EPROM, a flash drive, and a hard drive in hardware. The memory 180 may store various data for the overall operation of the intelligent computing device 100, such as a program for processing or controlling the processor 170. The memory 180 may be integrated with the processor 170. According to an embodiment, the memory 180 may constitute a sub-component of the processor 170.

The power supply 190 may supply power to the intelligent computing device 100. The power supply 190 may receive power from a power source (e.g. battery) included in the intelligent computing device 100, and then may supply power to each unit of the intelligent computing device 100. The power supply 190 may be operated in response to a control signal provided from a main ECU 240. The power supply 190 may include a switched-mode power supply (SMPS).

The processor 170 may be electrically connected to the memory 180, the interface unit 280, and the power supply 190 to exchange a signal. The processor 170 may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electric units for performing other functions.

The processor 170 may be driven by power supplied from the power supply 190. The processor 170 may receive data, process data, generate a signal and provide the signal, in the state where power is supplied by the power supply 190.

The processor 170 may receive information from another electronic device in the intelligent computing device 100. The processor 170 may provide a control signal, through the interface unit, to another electronic device in the intelligent computing device 100.

The intelligent computing device 100 may include at least one printed circuit board (PCB). The memory 180, the interface unit, the power supply 190, and the processor 170 may be electrically connected to the printed circuit board.

Hereinafter, another electronic device in the intelligent computing device connected to the interface unit and the AI processor 261 will be described in more detail.

Meanwhile, the intelligent computing device 100 may transmit data acquired by the intelligent computing device 100 through the communication unit 160 to the AI device 200, and the AI device 200 may transmit the AI processing data, generated by applying the neural network model 26 to the transmitted data, to the intelligent computing device 100. The intelligent computing device 100 may recommend a book to a user, based on the received AI processing data. As another example, the AI processing data itself may include data related to the book that is to be recommended to the user.

The communication unit 160 may exchange a signal with a device that is located outside the intelligent computing device 100. The communication unit 160 may exchange a signal with at least one of an infrastructure (e.g. server, broadcasting station), an IoT device, another intelligent computing device, and a terminal. The communication unit 160 may include at least one of a transmission antenna, a reception antenna, a radio frequency (RF) circuit capable of implementing various communication protocols, and an RF element to perform communication.

Recently, due to the development of information and communication technology, the Internet of Things (IoT) technology is also improved.

However, many devices do not have the Artificial Intelligence (AI) function yet, in spite of the development of the IoT technology. In order to use the AI function, it is expensive to purchase new devices having the AI function, and it takes a lot of time to search for and purchase devices having a desired AI function.

Therefore, a method for associating several devices having no AI function with the AI devices using the IoT technology is required, and research on the method is being conducted.

Accordingly, in order to solve the above-described inconveniences and problems, a method of associating existing devices (e.g. home appliances) having no AI function with the AI device using the IoT technology is proposed herein.

Figure 8:
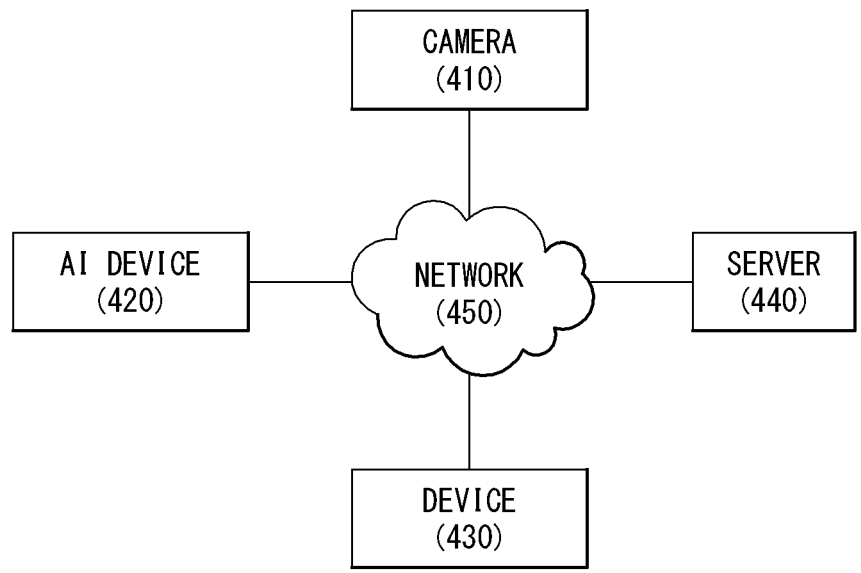
FIG. 8 is an example of a block diagram of the system associating the AI device with the device proposed in the disclosure.

FIG. 8 is an example of a block diagram of the system associating the AI device with the device proposed in the disclosure.

That is, the block diagram of the system for performing a method of associating the AI device 420 with the device 430 based on the behavior pattern of a user is provided.

Referring to FIG. 8, the system associating the AI device with the device proposed in the disclosure may include a camera 410, an AI device 420, a device 430, and a server 440. These components may be connected using a network 450. Here, the network 450 may mean a communication network, for example a 5G, an IoT network or the like.

Particularly, the camera 410, the AI device 420, and the devices 430 may be connected to each other via the IoT network.

Herein, the camera 410 may be a camera having the AI function. Here, the camera detects the device 430, and performs the function of recognizing whether a user approaches the device 430 or perform a specific behavior, that is, a user's life/behavior pattern.

The AI device 420 means a device for recognizing a voice command that causes a user to perform the operation of the device 430. For example, the AI speaker, the microphone or the like may be the AI device 420.

The device 430 may be a plurality of devices or the device 430 having no AI function, but is not limited thereto. For example, the device 430 may be a home appliance. Such a device 430 may receive a control instruction for the voice command recognized by the AI device 420 from the AI device 420 to perform an operation corresponding to the voice command.

The block diagram of the system associating the AI device with the device proposed in the disclosure including the server 440 is shown in FIG. 8, but the server is not an essential component and thus may be included if desired.

The server 440 may be mainly connected to the AI device 420 to receive a user's voice command transmitted by the AI device 420, and may transmit the corresponding control instruction of the device 430 to the AI device 420.

Hereinafter, a method of associating the AI device with the device will be described in detail.

Figure 9:
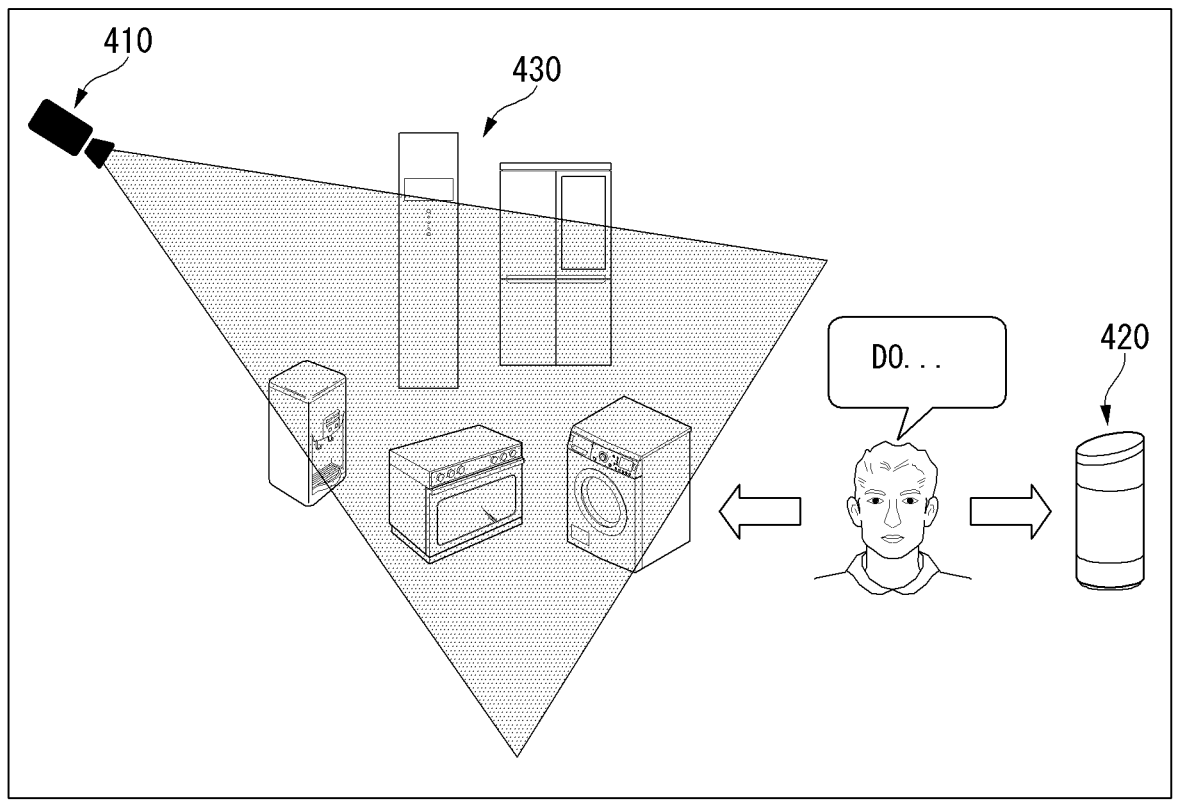
FIG. 9 is an example of a method of associating the AI device with the device proposed in the disclosure.

FIG. 9 is a diagram showing an example of the method of associating the AI device with the device proposed in the disclosure.

Referring to FIG. 9, the camera 410 senses the device(s) 430.

In this regard, the camera 410 may sense a user approaching the device(s) 430 and/or specific behaviors for the user's device(s) 430, and may recognize a corresponding situation. In other words, the camera 410 may sense the user's life/behavior pattern (action) and may recognize the situation. The operation of sensing the user's life/behavior pattern (action) and recognizing the situation may be a specific situation corresponding to a preset pattern (action).

That is, if a user performs a behavior similar or equal to the preset pattern (action), the camera 410 may sense the behavior and recognize it as a corresponding specific situation.

In this regard, if the camera 410 senses a user's specific pattern (action), the sensing of the specific pattern (action) may be transmitted to the AI device 420 and the AI device 420 receiving the sensed result may be switched to a standby status for recognizing the voice command.

The AI device 420 performs the function of receiving and sensing the voice command that causes the user to perform the operation of the device.

For example, as shown in FIG. 9, if a user utters (inputs) the voice command such as "do xx" to the AI device 420, the AI device 420 recognizes the voice command. Furthermore, the control instruction may be transmitted to the device(s) 430 to perform the operation of the device(s) 430 corresponding to the voice command.

Meanwhile, the voice command may be a voice command in which the wakeup word is omitted.

The term "wakeup word" may be expressed as a "startup word", and may be a command requiring conversion to a state that causes the AI device to recognize the voice command.

For example, assuming that a user has uttered (input) voice such as "Hi LG, do xx" to the AI device, "Hi LG" corresponds to the wakeup word.

In other words, an existing AI device should be switched to the reception standby status to receive the voice command. Here, the wakeup word for switching the device to the reception standby status is "Hi LG".

However, the wakeup word is omitted in the voice command described herein. Since the camera 410 senses the user's specific pattern (action) and transmits the sensing of the specific pattern (action) to the AI device 420, and the AI device 420 receiving the specific pattern is switched to the standby status for recognizing the voice command, a separate wakeup word is not required.

In this regard, the voice command is a preset command, and may be a command corresponding to the specific action to perform the specific operation.

Figure 10:
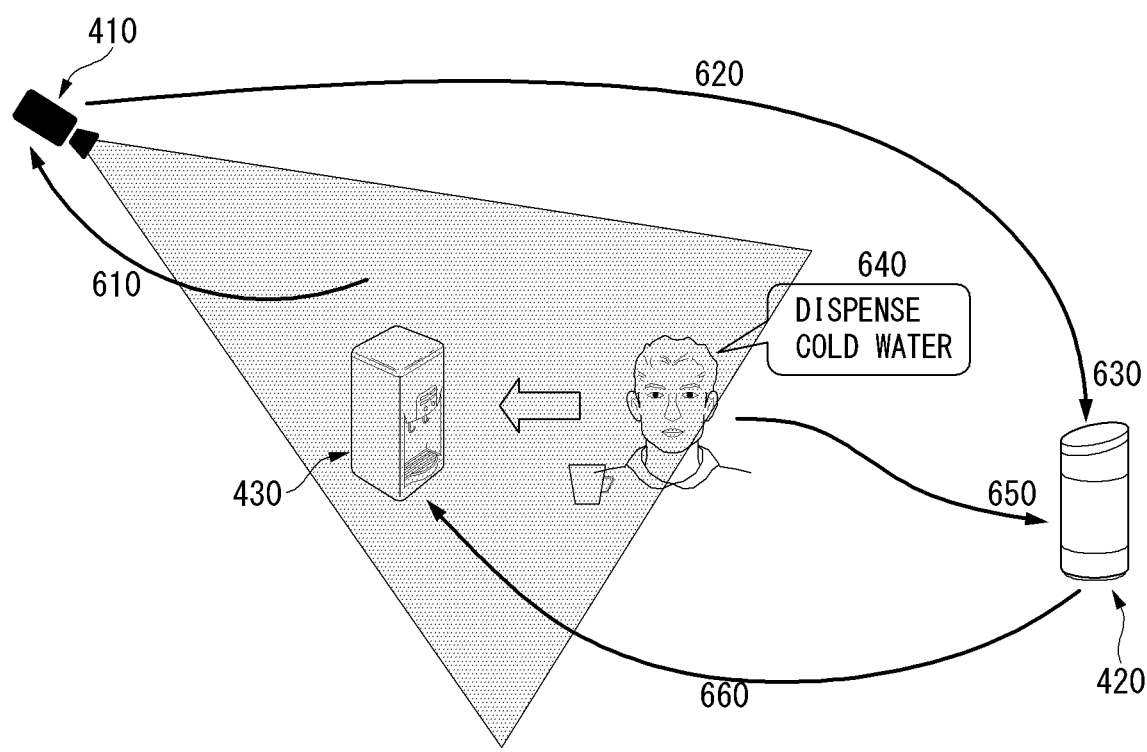
FIG. 10 is another example of the method of associating the AI device with the device proposed in the disclosure.

FIG. 10 is a diagram showing another example of the method of associating the AI device with the device proposed in the disclosure.

Referring to FIG. 10, the method of associating the device 430 (e.g. water purifier) performing an operation corresponding to a user's voice command, the camera 410 and the AI device 420 will be described.

FIG. 10 illustrates the water purifier as an example of the device 430, but the device is not limited to the water purifier.

First, the camera 410, the AI device 420 and the device 430 (e.g. water purifier) may be connected to each other via the IoT network.

When a user approaches the water purifier, the camera 410 may sense that he or she approaches the water purifier. In addition, the camera may sense the specific pattern (action) of the user acting on the water purifier (610).

For example, when the user places a cup on a water trough of the water purifier, the camera 410 may sense a situation where the cup is placed on the water trough of the water purifier and water is about to be dispensed.

The camera 410 sensing and recognizing such a situation may request the AI device 420 to be switched to a voice-command standby status (620).

Upon receiving the request, the AI device 420 is switched to a standby status for recognizing the voice command, and is ready to recognize the user's voice command (630).

Subsequently, if the user utters (inputs) the voice command, the AI device 420 recognizes the voice command. In this regard, the voice command may be a preset command or a command in which the wakeup word is omitted (640, 650).

In this regard, the AI device 420 receiving the voice command transmits the control instruction, which causes the device to perform the operation corresponding to the voice command, to the water purifier (660).

For example, if the user utters (inputs) the voice command of "Dispense cold water", the AI device 420 may recognize the voice command, and may transmit the control instruction, which causes the device to perform the operation corresponding to the voice command, to the water purifier.

Furthermore, the water purifier receives the control instruction and then performs the corresponding operation.

For example, the water purifier receiving the control instruction for performing the operation corresponding to the voice command of "Dispense cold water" may perform the operation of dispensing cold water, and in addition, may perform the operation of dispensing a specific volume (e.g. 100 ml) of water.

In this regard, the operation of the water purifier may be configured such that a corresponding operation is preset for each specific control instruction.

In other words, the operation corresponding to the voice command may be preset, and the control instruction for controlling the corresponding operation may also correspond to the voice command.

Figure 11:
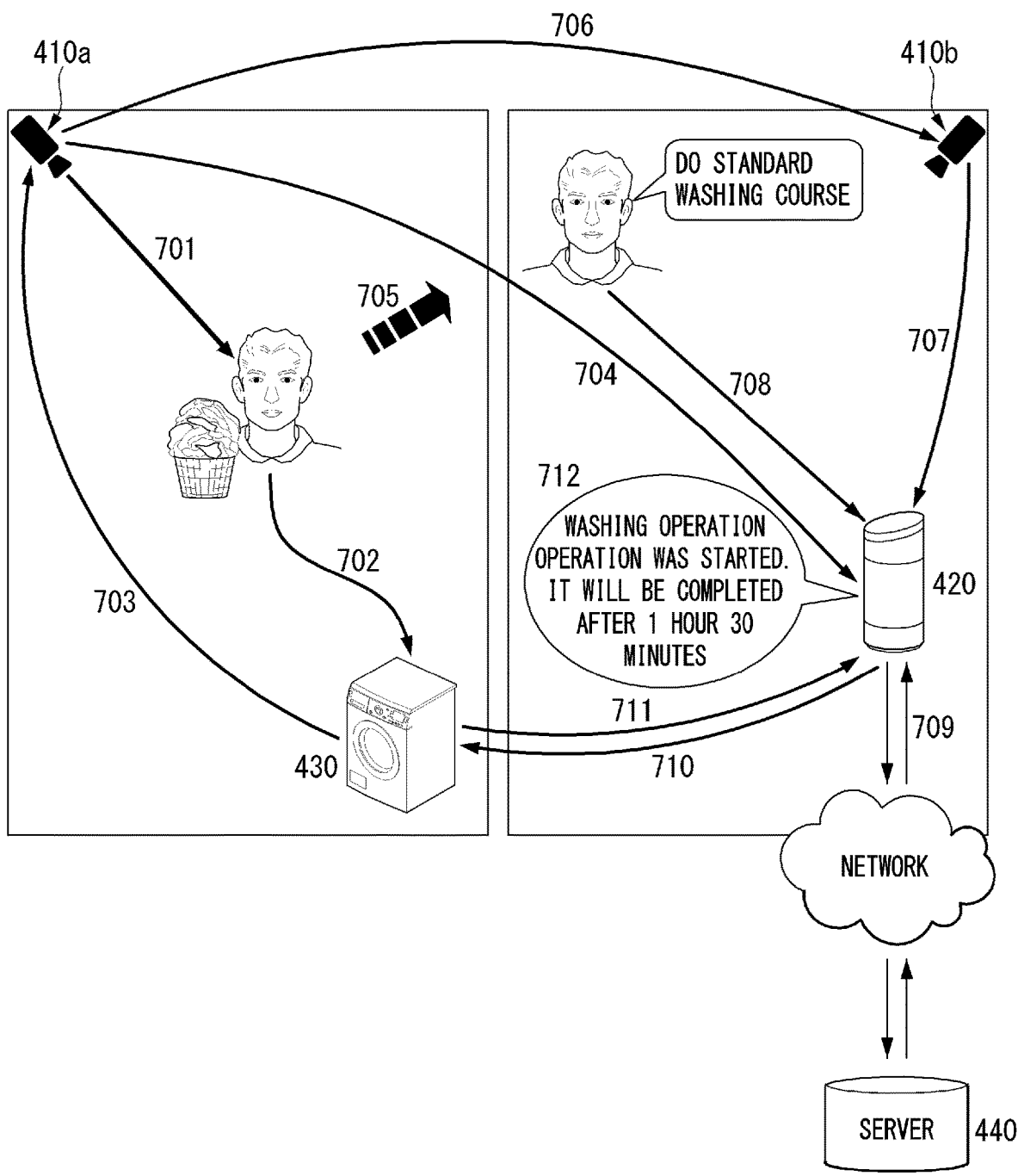
FIG. 11 is a further example of the method of associating the AI device with the device proposed in the disclosure.

FIG. 11 is a diagram showing a further example of the method of associating the AI device with the device proposed in the disclosure.

FIG. 11 illustrates the method of associating the AI device 420 with the device 430 when a first camera 410a, a second camera 410b, and the AI device 420 are located at different spaces.

Referring to FIG. 11, in order to perform the method of associating the AI device with the device proposed in the disclosure, the camera 410 may include a plurality of first cameras 410a and second cameras 410b. Each first camera 410a may be located at the same space as the device 430 (e.g. washing machine), and each second camera 410b may be located at the same space as the AI device 420. In other words, the device 430 and the AI device 420 may be located at different positions.

The first camera 410a located at the same space as the washing machine senses that a user approaches the washing machine (701). Furthermore, the first camera senses the user's behavior of putting laundry and detergent into the washing machine (702). In this regard, the user's behavior may correspond to a preset pattern (behavior).

That is, the first camera 410a may recognize a situation through the sensed image, namely, may recognize a situation where the user is about to wash clothes through the sensed image.

In this regard, the washing machine may transmit notification that it is ready to wash clothes, after the user's behavior is finished, to the first camera 410a (703).

Furthermore, if the first camera 410a recognizes a situation where the user is about to wash clothes and receives the notification that the washing machine is ready to wash clothes, from the washing machine, the camera may request the AI device 420 to be switched to a standby status for recognizing the voice command (704).

In this regard, the first camera 410a may notify the AI device 420 that a laundry-related voice command will be uttered (input), and the AI device 420 receiving the notification may be switched to the standby status for receiving the laundry-related voice command.

That is, the AI device is switched to a status for receiving the voice command corresponding to the user's specific behavior.

Furthermore, when the user moves to a different place to input the voice command to the AI device 420 located at the different place, namely, when the user moves from a space where the washing machine is located to a space where the AI device 420 is located, the first camera 410a located at the same place as the washing machine may sense the user's movement, and may notify the second camera 410b located at the same place as the AI device 420 that the user moves (706).

Thereafter, the second camera 410b receiving the user's movement may extend a standby-status holding time for receiving the voice command (707) of the AI device 420.

The standby status for receiving the voice command of the AI device 420 may be set to be maintained for a specific time. If there is a user's spatial movement as described above, the standby-status holding time may be extended in consideration of a time when the user moves from a space to another space.

In other words, after the first camera 410a recognizes the user's behavior, it is checked whether the user moves to an area of the voice recognizable device, namely, to an area where the AI device 420 is located, thus extending the standby-status holding time for receiving the voice command.

Subsequently, the user may utter (input) the voice command to the AI device 420 that is in the standby status (708). For example, in order to perform the washing operation of the washing machine, it is possible to utter (input) the voice command of "Do standard washing course" to the AI device 420. The voice command may be a voice command in which the wakeup word is omitted.

In this regard, the voice command is a command for performing the specific operation of the washing machine, and may command the washing machine to a specific washing method (standard course, cold-water washing and the like).

Thereafter, the AI device 420 into which the voice command has been input may transmit information about the voice command to the server 440, so as to receive the control instruction corresponding to the voice command. The server 440 receiving the information transmits the control instruction corresponding to the received voice command to the AI device 420 (709).

The control instruction of FIG. 11 may be a control instruction for performing a washing operation in a standard washing mode.

Here, the control instruction may be an instruction for operating the washing machine, and may correspond to the above voice command. Such a control instruction may be preset.

Next, the AI device 420 receiving the control instruction transmits the control instruction for performing the washing operation in the standard washing mode to the washing machine. The washing machine receiving the control instruction performs the operation corresponding to the received control instruction, and transmits operation performance information to the AI device 420 (710, 711).

Referring to FIG. 11, the washing machine receiving the control instruction executes the washing operation in the standard washing mode, and transmits washing execution information to the AI device 420. The washing execution information may include information about whether to start washing, an expected time when washing is completed, etc.

In other words, the washing execution information may mean the operation performance information of the device corresponding to the voice command, namely, the control instruction.

Furthermore, the AI device 420 receiving the operation performance information may notify a user of the operation performance information by a voice message (712).

That is, as illustrated in FIG. 11, the AI device 420 may output the voice message such as "The washing operation was started. It will be completed after 1 hour 30 minutes".

As described above, the first and second cameras 410a and 410b, the AI device 420 and the device 430 may be connected to each other using the IoT network.

According to the above-described embodiments, the existing home appliances having no AI function and the AI devices are connected to each other via the IoT network, thus offering a seamless user experience and consequently increasing his or her convenience.

Figure 12:
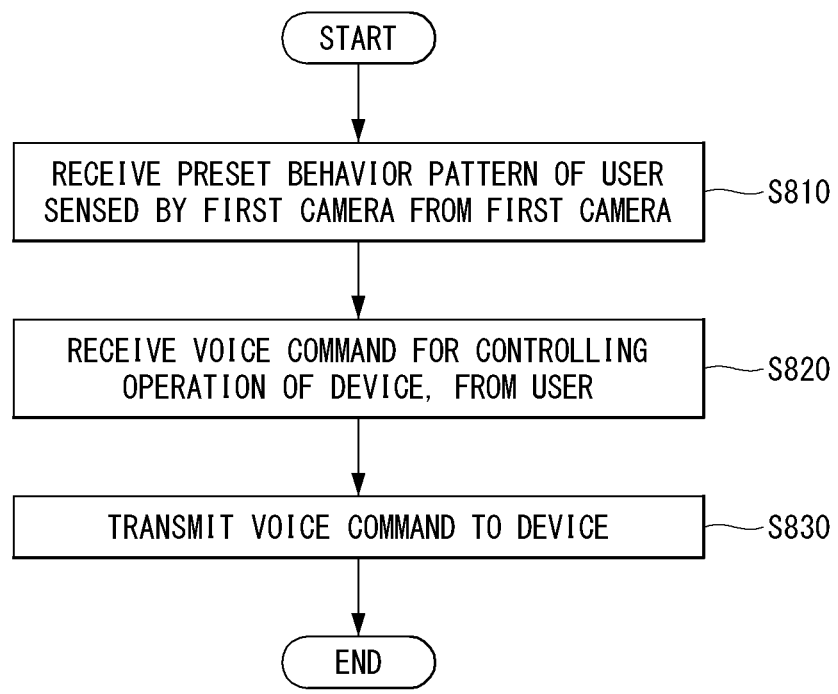
FIG. 12 is an example of a flowchart showing operations of the method of associating the AI device with the device proposed in the disclosure.

FIG. 12 is an example of a flowchart showing operations of the method of associating the AI device with the device proposed in the disclosure.

That is, the flowchart shows the method of associating the Artificial Intelligence (AI) device 420 with the device 430 based on the behavior pattern of the user.

The AI device 420 receives the preset behavior pattern of the user sensed by the first camera 410a from the first camera 410a, at step S810.

Furthermore, the AI device 420 receives the voice command for controlling the operation of the device 430 from the user, at step S820.

The AI device 420 transmits the voice command to the device 430, at step S830.

In this regard, the voice command may be a command corresponding to the preset behavior pattern of the user.

Meanwhile, at step S830, the AI device 420 may transmit the voice command to the server 440, may receive a control instruction for controlling the operation of the device 430 corresponding to the voice command from the server 440, and may transmit the control instruction to the device 430.

In addition, the AI device 420 may receive the operation performance result corresponding to the control instruction, from the device 430.

Meanwhile, at step S820, the AI device is operated in the standby status for receiving the voice command, and receives the voice command for operating the device from the user in the standby status.

In this regard, the standby status may be performed for a preset time, and the preset time may be determined based on the preset behavior pattern of the user.

Meanwhile, when the first camera 410a and the device 430 are located at a first space, the second camera 410b and the AI device 420 are located at a second space, and the user moves from the first space to the second space, the AI device 420 may receive information about the user's spatial movement, from the second camera 420b.

In this regard, the information about the user's spatial movement may be information that is obtained by sensing the user's spatial movement using the first camera 410a and is transmitted to the second camera 410b.

In this regard, the first camera 410a, the AI device 420, and the device 430 may be connected to each other using the Internet of Things (IoT) network.

Hereinafter, the AI device 420 for performing the method of associating the Artificial Intelligence (AI) device 420 with the device 430 based on the behavior pattern of the user will be described.

The AI device 420 may include a Radio Frequency (RF) module to transmit and receive a wireless signal, and a processor functionally connected to the RF module.

The processor controls the RF module to receive the preset behavior pattern of the user sensed by the first camera 410a from the first camera 410b.

The processor controls the RF module to receive the voice command for controlling the operation of the device 430 from the user and to transmit the voice command to the device 430.

In this regard, the voice command may be a command corresponding to the preset behavior pattern of the user.

The processor controls the RF module to transmit the voice command to the server 440.

The processor controls the RF module to receive the control instruction for controlling the operation of the device 430 corresponding to the voice command from the server 440 and to transmit the control instruction to the device 430.

The processor controls the RF module to receive the operation performance result corresponding to the control instruction, from the device 430.

The processor controls the RF module so that the AI device 420 is operated in the standby status for receiving the voice command.

The processor controls the RF module to receive the voice command for operating the device 430 from the user in the standby status.

In this regard, the standby status may be performed for a preset time, and the preset time may be determined based on the behavior pattern of the user.

When the first camera 410a and the device 430 are located at the first space, the second camera 410b and the AI device 420 are located at the second space, and the user moves from the first space to the second space, the processor controls the RF model to receive information about the user's spatial movement, from the second camera 420b.

In this regard, the information about the user's spatial movement may be information that is obtained by sensing the user's spatial movement using the first camera 410a and is transmitted to the second camera 410b.

In this regard, the first camera 410a, the AI device 420, and the device 430 may be connected to each other using the Internet of Things (IoT) network.

Meanwhile, there may be an electronic device including a command for performing the method of associating the AI device with the device.

To be more specific, the electronic device may include one or more processors, a memory, and one or more programs. Here, the electronic device may be configured such that the programs may be stored in the memory and may be executed by the processors, and may include a command for performing the method of associating the AI device with the device based on the behavior pattern of the user.

Next, the method of connecting the AI device 420 to the base station and performing the initial access procedure will be described.

First, the server 440 may perform the initial access procedure to the AI device 20 by periodically transmitting the Synchronization Signal Block (SSB), and may perform the random access procedure to the AI device 420.

Subsequently, the server 440 may transmit the uplink grant (UL grant) to the AI device 420 to control the operation of the device 430.

Based on the uplink grant, the control instruction corresponding to the voice command for controlling the operation of the device 430 may be transmitted to the AI device 420.

In this regard, the voice command may correspond to the preset behavior pattern of the user.

Thereafter, the AI device 420 may transmit the control instruction to the device 430.

In this regard, a process of performing a downlink (DL) beam management procedure using the SSB may be further included.

As described above, the above-described 5G technology may be applied when the camera 410, the AI device 420, the device 430, and the server 440 transmit and receive information or when the above-described initial access procedure is performed.

The above-described present invention can be implemented with computer-readable code in a computer-readable medium in which program has been recorded. The computer-readable medium may include all kinds of recording devices capable of storing data readable by a computer system. Examples of the computer-readable medium may include a hard disk drive (HDD), a solid state disk (SSD), a silicon disk drive (SDD), a ROM, a RAM, a CD-ROM, magnetic tapes, floppy disks, optical data storage devices, and the like and also include such a carrier-wave type implementation (e.g., transmission over the Internet). Therefore, the above embodiments are to be construed in all aspects as illustrative and not restrictive. The scope of the invention should be determined by the appended claims and their legal equivalents, not by the above description, and all changes coming within the meaning and equivalency range of the appended claims are intended to be embraced therein.

Furthermore, although the invention has been described with reference to the exemplary embodiments, those skilled in the art will appreciate that various modifications and variations can be made in the present invention without departing from the spirit or scope of the invention described in the appended claims. For example, each component described in detail in embodiments can be modified. In addition, differences related to such modifications and applications should be interpreted as being included in the scope of the present invention defined by the appended claims.

Although description has been made focusing on examples in which the present invention is applied to automated vehicle & highway systems based on 5G (5 generation) system, the present invention is also applicable to various wireless communication systems and autonomous devices.

The effects of a notification providing method according to an embodiment of the present invention will be described as follows.

The present invention has an advantage in that it can recognize the behavior pattern of a user by associating a device having no AI function with an AI device, and can perform the operation of the device based on the behavior pattern.

Furthermore, the present invention has an advantage in that a command for performing the operation of the device based on the behavior pattern of a user may be a command having no wakeup word.

The effects achieved by the present invention are not limited to the above-mentioned effects, and other effects will be clearly understood by those skilled in the art from the following description.

What is claimed is:

1. A method of associating an Artificial Intelligence (AI) device with a device based on a behavior pattern of a user, the method performed by the AI device comprising:
   receiving a preset behavior pattern of the user sensed by a first camera from the first camera;
   receiving a voice command for controlling an operation of the device, from the user; and
   transmitting the voice command to the device,
   wherein the voice command is a command corresponding to the preset behavior pattern of the user, and
   wherein the receiving of the voice command for controlling the operation of the device from the user comprises:
   operating in a standby status to receive the voice command for a preset time determined on the basis of the behavior pattern of the user; and
   receiving the voice command to perform the operation of the device from the user in the standby status.

2. The method of claim 1, wherein the transmitting of the voice command to the device comprises:
   transmitting the voice command to a server;
   receiving a control instruction for controlling an operation of the device corresponding to the voice command from the server; and
   transmitting the control instruction to the device.

3. The method of claim 2, further comprising:
   receiving an operation performance result corresponding to the control instruction, from the device.

4. The method of claim 1, further comprising:
   receiving information about the user's spatial movement from a second camera, when the first camera and the device is located at a first space, the second camera and the AI device is located at a second space, and the user moves from the first space to the second space,
   wherein the information about the user's spatial movement is information that is obtained by sensing the user's spatial movement using the first camera and is transmitted to the second camera.

5. The method of claim 1, wherein the first camera, the AI device and the device are connected to each other via an Internet of Things (IOT) network.

6. An AI device for performing a method of associating the Artificial Intelligence (AI) device with a device based on a behavior pattern of a user, the AI device comprising:
   a Radio Frequency (RF) module configured to transmit and receive a wireless signal; and
   a processor functionally connected to the RF module,
   wherein the processor receives a preset behavior pattern of the user sensed by a first camera from the first camera, receives a voice command for controlling an operation of the device from the user, and transmits the voice command to the device,
   wherein the voice command is a command corresponding to the preset behavior pattern of the user, and
   wherein the processor operates in a standby status to receive the voice command for a preset time determined on the basis of the behavior pattern of the user, and receives the voice command to perform the operation of the device from the user in the standby status.

7. The AI device of claim 6, wherein the processor transmits the voice command to a server, receives a control instruction for controlling an operation of the device corresponding to the voice command from the server, and transmits the control instruction to the device.

8. The AI device of claim 7, wherein the processor receives an operation performance result corresponding to the control instruction, from the device.

9. The AI device of claim 6, wherein the processor receives information about the user's spatial movement from a second camera, when the first camera and the device is located at a first space, the second camera and the AI device is located at a second space, and the user moves from the first space to the second space,
   wherein the information about the user's spatial movement is information that is obtained by sensing the user's spatial movement using the first camera and is transmitted to the second camera.

10. The AI device of claim 6, wherein the first camera, the AI device and the device are connected to each other via an Internet of Things (IOT) network.

11. An electronic device, comprising:
    at least one processor;
    a memory; and
    at least one program,
    wherein the program is stored in the memory and is executed by the processor, the program comprising a command for performing the method of claim 1.

* * * * *